US012790236B2

(12) United States Patent
Swadling

(10) Patent No.: US 12,790,236 B2
(45) Date of Patent: Nov. 10, 2026

(54) INDUSTRIAL WASTE TREATMENT AND DE-WATERING SYSTEM

(71) Applicants: Safetykleen Group Services Limited, Brentford (GB); Adam Swadling, Brentford (GB)

(72) Inventor: Adam Swadling, Brentford (GB)

(73) Assignee: Safetykleen Group Services Limited, Brentford (GB)

( * ) Notice: Subject to any disclaimer, the term of this patent is extended or adjusted under 35 U.S.C. 154(b) by 362 days.

(21) Appl. No.: 18/280,843

(22) PCT Filed: Mar. 7, 2022

(86) PCT No.: PCT/EP2022/055735

§ 371 (c)(1),
(2) Date: Sep. 7, 2023

(87) PCT Pub. No.: WO2022/189349

PCT Pub. Date: Sep. 15, 2022

(65) Prior Publication Data

US 2024/0150199 A1 May 9, 2024

(30) Foreign Application Priority Data

Mar. 8, 2021 (GB) ...................................... 2103218

(51) Int. Cl.
*C02F 1/04* (2023.01)
*B01D 1/00* (2006.01)
(Continued)

(52) U.S. Cl.
CPC ............ *C02F 1/048* (2013.01); *B01D 1/0088* (2013.01); *B01D 1/12* (2013.01); *B01D 1/14* (2013.01);
(Continued)

(58) Field of Classification Search
CPC .. C02F 1/048; C02F 1/008; C02F 1/14; C02F 2001/007; C02F 2101/301; C02F 2101/32;
(Continued)

(56) References Cited

FOREIGN PATENT DOCUMENTS

| | | |
|---|---|---|
| DE | 201 07 576 A1 | 9/2001 |
| FR | 2 913 761 A1 | 9/2008 |

(Continued)

OTHER PUBLICATIONS

FR3065517—Nicola—Effluent Storage Tank & System for Evaporation (Ab & MT; Oct. 26, 2018; 19 p) (Year: 2018).*

(Continued)

*Primary Examiner* — Hayden Brewster
(74) *Attorney, Agent, or Firm* — Optimus Patents US, LLC

(57) ABSTRACT

A de-watering system for liquid industrial waste from an industrial cleaning process is provided. The liquid industrial waste has an initial water content, and comprises detergents and solid waste. A de-watering bed (430) holds the liquid industrial waste. Air in a first zone (420) is enclosed by a transparent structure (410) and is heated by the sun during daytime. A first controllable opening (450) controls a rate of flow of air in the first zone (420). Water from the liquid industrial waste evaporates into heated air in the first zone (420). An air removal conduit (440) allows heated air to vent to the atmosphere. A control system (380) selectively opens the first controllable opening (450), to regulate the flow of air. De-watering continues until a selectable end point, based on residual water content of the waste, or a final concentration of non-water components.

19 Claims, 21 Drawing Sheets

(51) Int. Cl.

| | |
|---|---|
| ***B01D 1/12*** | (2006.01) |
| ***B01D 1/14*** | (2006.01) |
| ***B01D 1/30*** | (2006.01) |
| ***C02F 1/00*** | (2023.01) |
| ***C02F 1/14*** | (2023.01) |
| ***C02F 101/30*** | (2006.01) |
| *C02F 101/32* | (2006.01) |
| *C02F 103/34* | (2006.01) |

(52) U.S. Cl.
CPC ................ *B01D 1/30* (2013.01); *C02F 1/008* (2013.01); *C02F 1/14* (2013.01); *C02F 2001/007* (2013.01); *C02F 2101/301* (2013.01); *C02F 2101/32* (2013.01); *C02F 2103/34* (2013.01); *C02F 2201/007* (2013.01); *C02F 2201/009* (2013.01); *C02F 2209/005* (2013.01); *C02F 2209/02* (2013.01); *C02F 2209/03* (2013.01); *C02F 2209/10* (2013.01); *C02F 2209/38* (2013.01); *C02F 2209/40* (2013.01); *C02F 2209/42* (2013.01); *C02F 2303/10* (2013.01)

(58) Field of Classification Search
CPC ............ C02F 2103/34; C02F 2201/007; C02F 2201/009; C02F 2209/005; C02F 2209/02; C02F 2209/03; C02F 2209/10; C02F 2209/38; C02F 2209/40; C02F 2209/42; C02F 2303/10; C02F 11/12; C02F 11/13; C02F 11/16; B01D 1/0088; B01D 1/12; B01D 1/14; B01D 1/30; B01D 1/0035; B01D 1/0094; B01D 3/346; F26B 3/286; F26B 21/12
USPC .......................................................... 210/742
See application file for complete search history.

(56) References Cited

FOREIGN PATENT DOCUMENTS

| | | | |
|---|---|---|---|
| FR | 3 065 517 | A1 | 10/2018 |
| WO | 2011072252 | A2 | 6/2011 |

OTHER PUBLICATIONS

Ekechukwu O V et al "Review of solar-energy drying systems II: an overview of solar drying technology", Energy Conversion and , Elsevier Science Publishers, Oxford, GB, vo1. 40, No. 6, Apr. 1, 1999 (19$9-04-01), pp. 615-655, XP004144353, ISSN: 0196-8904, DO:C: 10.1016/S0196-8904(98)00093-4, abstract; figures 2, 3, 5.

EPO Article 94(3) Communication; EPO Application Serial No. 22709330.9; SafetyClean Group Services, Ltd; Jul. 23, 2025; pp. 1-8.

* cited by examiner

INDUSTRIAL WASTE TREATMENT AND DE-WATERING SYSTEM

FIELD OF THE INVENTION

The field of the invention is the treatment of liquid industrial waste from industrial cleaning operations.

BACKGROUND

Industrial cleaning processes often involve the cleaning of equipment, products or buildings. The cleaning processes may use water and detergents. Detergents are normally composed of a mixture of surfactants. Other chemistries may also be included in the mixture. For example, surfactants, 'builders' chelants, corrosion inhibitors, and/or pH modifiers may be included in the products of industrial cleaning processes. There can be over 55 different detergents that may be used in the industrial cleaning process operated by one cleaning operator, and any of these detergents may arrive in a variety of concentrations in liquid industrial waste.

The cleaning process, therefore, leads to the creation of liquid industrial waste. The liquid industrial waste contains water, the mixture of surfactants and other chemicals, and remnants that have been cleaned off the equipment, products or buildings. Such remnants can take a wide variety of forms, depending on the cleaning that has been undertaken. The remnants may, for example, be rust, salt, grease, oil, or other 'soil'. Here 'soil' is other solid or liquid waste products, from the object or environment that has been cleaned.

Such liquid industrial waste cannot be disposed of by pouring into normal drainage systems. As a consequence, specialist techniques are used for treating liquid industrial waste. These techniques are usually conducted by specialist contractors, i.e. not at the site at which the liquid industrial waste is created.

One known method of treatment of liquid industrial waste is incineration. Incineration is energy intensive. There are environmental drawbacks involved in the resulting $CO_2$ emissions from such incineration processes. In addition, the wide variety of remnants, such as rust, may lead to undesirable combustion products from the incineration process. Eliminating some products may require heating to very high temperatures, which requires highly specialised equipment.

A second known method of treatment of the liquid industrial waste is to use an 'evapo-concentrator'. Several variations exist in this type of treatment. In general, the waste is actively heated, typically using fossil fuels to provide the heat. The heating is done in a partial vacuum, to evaporate the water content. This aspect of the process, therefore, involves the complexity of maintaining the partial vacuum. The partial vacuum is chosen in combination with the operating temperature. For example, a reduction in pressure to 0.1 bar may be used at an operating temperature of 45 C. A slightly smaller pressure reduction than a reduction to 0.1 bar may be used at 80 C or above. After processing, the water is then often recondensed, in a second chamber. The heating and pressure reduction require a large power input into the system. This method is also sensitive to certain types of waste contamination, such as solvents. At least some parts of the processing equipment require regular maintenance from a qualified technician.

FIG. 1 shows a greatly simplified diagram of a known evapo-concentrator, which is generally indicated by reference 100. An evaporator body 110 and an upper container section 120 are shown. Evaporator body 110 and upper container section 120 together provide a space for treating liquid industrial waste. During operation, the space is closed to the atmosphere. In a typical large industrial system, the evaporator body 110 and upper container section 120 together might have a height of 4 metres as shown. The extent of the floor area for the whole plant shown in FIG. 1 might be 5 metres by 10 metres, typically.

Heating 130 is applied to evaporator body 110. On heating, gaseous water will occupy upper container section 120, with heavier components of the waste tending to remain in evaporator body 110. Vacuum pump 140 controls the pressure reduction applied within the evaporator body 110 and the upper container section 120. An inlet for liquid waste is generally indicated at 150. A flow of treated liquid is generally shown at 160. The flow of treated liquid passes on to a condenser 170. After condensation, treated water/distillate is shown passing out of condenser 170 at 180. The removal of residual concentrated waste from evaporator 110 is shown at 190.

The technical field of the treatment of liquid industrial waste from industrial cleaning processes is a distinct field from the technical field of processing domestic and public waste. In contrast to liquid industrial waste from industrial cleaning processes, waste from foul drains or sewage typically has a high loading of human pathogens. That waste can be treated by a variety of physical separation steps and then biological, ultraviolet or even ultrasound treatment to neutralise pathogens. In particular, municipal waste streams can be treated by various biological elements that take care of solid elements in the municipal waste, through aerobic and anaerobic digestion. Those solids may then "drop out" of the water, by sedimentation. Some municipal waste treatment plants are very sensitive to damage by particular contaminants that may be included in liquid industrial waste, and thus municipal waste treatment plants need to be protected from such waste.

Liquid industrial wastes, such as those that are the subject of the present application, are strictly controlled in most countries. This is so that the industrial contaminants do not "kill the bugs" that digest the municipal/domestic waste streams. Any influx of heavy metals, solvents or any antimicrobial chemical can be catastrophic to a municipal/domestic sewage treatment plant, particularly as many such plants lack a high volume buffer to dilute contaminants. Municipal/domestic sewage treatment plants can be considered to be huge bioreactors and filtration units, and thus it can be seen that they are a distinct field from that of the present application.

In addition, domestic and public waste flows arise in very large quantities, that require an underground pipe system to move the waste in urban settings. Further piping then takes treated waste away. The overall aim of such processing is usually to return water to a state where it can be discharged to a river or the sea, with very low levels of harmful pathogens.

SUMMARY OF THE INVENTION

In accordance with a first aspect of the present invention, a de-watering system for liquid industrial waste provided. In accordance with a second aspect of the present invention, a method of de-watering liquid industrial waste is provided. These and other aspects of the invention will be apparent from, and elucidated with reference to, the embodiments described hereinafter.

BRIEF DESCRIPTION OF THE DRAWINGS

The drawings illustrate aspects of the invention, and embodiments. However, the invention extends to combinations of features from different embodiments, and from different figures.

DETAILED DESCRIPTION

Figure 1:
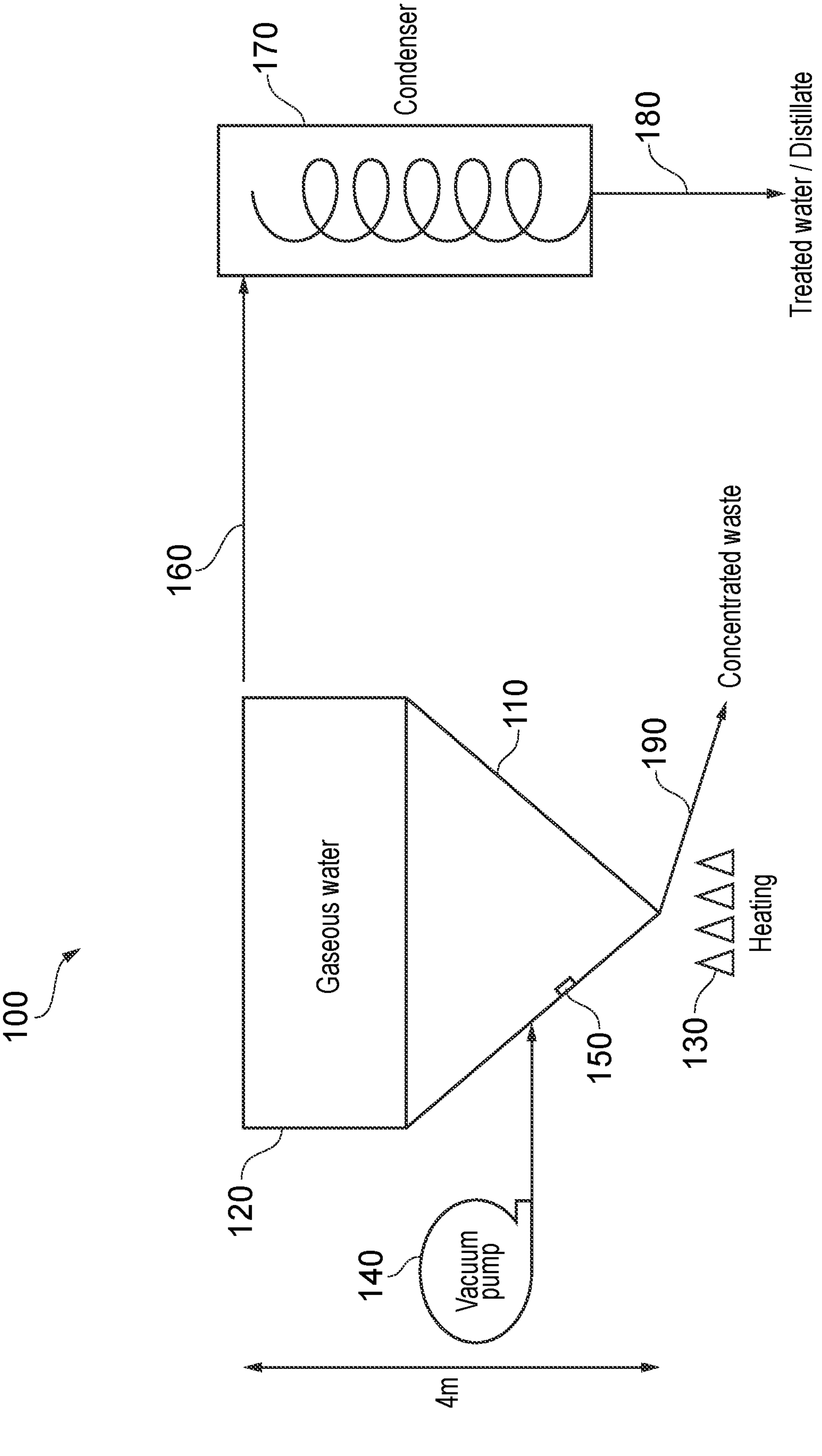
FIG. 1 illustrates functional features of a known evapo-concentrator, shown generally in a schematic, side cross-sectional view.

Example embodiments of the invention provide a de-watering system for processing liquid industrial waste. The liquid industrial waste is a product of an industrial cleaning process, and may in some cases have a water content in a range of 90%-95%. The balance of the liquid industrial waste comprises at least detergents, and waste matter from the industrial cleaning process. Some of the waste matter from the industrial cleaning process will be solid, such as flecks of rust or paint that have been removed from an object that has been cleaned. Some waste matter will in addition or alternatively be oil-based, where for example old lubricants or greases have been cleaned away from the object that has been cleaned.

The de-watering system comprises a de-watering bed. The de-watering bed is configured to hold the liquid industrial waste. The de-watering bed thus has closed sides and a base, to retain the liquid industrial waste, but is open at its upper surface. Thus liquid industrial waste in the de-watering bed is exposed to air passing over the de-watering bed. The water content of the liquid industrial waste can evaporate from the open upper surface of the de-watering bed, which thereby reduced the volume and the water content of the liquid industrial waste that remains in the de-watering bed.

The de-watering system also comprises a first zone, i.e. an enclosed volume of space, in which the de-watering bed is located. The first zone is enclosed and defined by a transparent structure. The transparent structure extends above the de-watering bed, and has sides that extend around and thus enclose the de-watering bed. The transparent structure is located outdoors. Thus air within the first zone is subject to solar heating during daytime. Any other thermal mass in the first zone will also be heated by sunlight and by heated air in the first zone, during daytime.

The transparent structure generally works in accordance with the 'greenhouse' effect. In essence, sunlight enters the transparent structure, and will heat objects inside the transparent structure. Those objects then re-radiate in the infrared part of the spectrum, at a wavelength that is dependent on their temperature. That radiation is predominantly at a longer wavelength than the sunlight, and will not pass out through the transparent structure. Thus heat is trapped within, and builds up in, the transparent structure.

The transparent structure has a first controllable opening, at a first end of the transparent structure. The first controllable opening is configured to admit air into the transparent structure. Thus air at ambient temperature from outside the transparent structure enters the first zone, under control of the controllable opening. The extent to which a control system opens the controllable opening will determine the rate at which air enters the first zone, although there may also be effects due to wind speed and direction outside the transparent structure. The transparent structure also has a second opening at a second end of the transparent structure. After passing through the first zone, air can exit the transparent structure through the second opening. By placing the first controllable opening and the second opening at opposite ends of the transparent structure, the air can be forced to move generally in a first direction, which is generally horizontal, throughout the whole length of the transparent structure. The distance between the first end and the second end of the transparent structure may be greater than a spacing between the other two vertical sides of the transparent structure, which further encourages air flow. The walls and roof of the transparent structure may comprise polycarbonate or glass, for example. The walls and roof may be supported and held within a metal, alloy or composite frame.

An air removal conduit is provided at the second end of the transparent structure. The air removal conduit is configured to allow heated air from the first zone to rise up the air removal conduit from the second opening of the transparent structure, and to vent to the atmosphere. Thus the air removal conduit is acting as a form of flue, or chimney. The air removal conduit ensures that the air that has passed through the second opening will now move in a second, vertical direction, as it rises up the air removal conduit to vent to the atmosphere.

The above configuration provides an open upper surface or face of the de-watering bed, from which water evaporates from the liquid industrial waste into heated air in the first zone. The water then passes through the first zone in the first direction, i.e. a direction from the first end of the transparent structure to the second end of the transparent structure. The water and heated air then pass in the second direction, i.e. up the air removal conduit. Thus the effect achieved is that liquid industrial waste loses water from the upper surface of the de-watering bed.

An example control system is provided. The example control system is configured to selectively open the first controllable opening at the first end of the transparent structure, to regulate a rate of flow of air through the first zone. In addition, the control system is configured to continue de-watering the liquid industrial waste, until reaching a selectable end point in the de-watering process. A level sensor in the de-watering bed provides an input signal to the control system, to enable a determination of the water content of the liquid industrial waste at different time points in the de-watering process.

For liquid industrial waste with an initial value of 90-95% water content, the de-watering may for example continue until the remaining liquid industrial waste has a percentage of water content that is roughly equal to the percentage of its volume occupied by the combination of the detergents and the waste. Thus, in this example, the water content drops from above 90% to 50%. Expressed in alternative units, the proportion of the liquid industrial waste that is detergent and waste, will rise from only 5-10% initially to being 50% at the selectable endpoint. The selectable end point may be set by an operator of the de-watering system, for example on the basis of a target residual water content of the liquid industrial waste that then allows suitable subsequent uses of the residual liquid industrial waste.

The control system receives inputs from various sensors around the system. The actual location of each sensor will depend on the exact configuration of the system. For example, when the system is configured with multiple de-watering beds, each bed may have a temperature and/or a depth sensor. The control system may receive inputs from sensors that provide measurements of any or all of the variables shown in table 1.

TABLE 1

Sensor types, variables measured, and locations in the system

| Sensor type | Variable measured | Location in system |
|---|---|---|
| Temperature | Air temperature | In first zone; at the air inlet(s) to the transparent structure; where air enters the air removal conduit; the apex level and the floor level of the transparent structure. |
| Temperature | Temperature of liquid industrial waste | Each de-watering bed. |
| Light level | Sun light incident on the system | The transparent structure's roof |
| Velocity | Velocity of moving air | At the air inlet(s) to the transparent structure; in the air removal conduit. |
| Fluid level | Level of liquid industrial waste | Each de-watering bed. |
| Humidity | Humidity of air | At the air inlet(s) to the transparent structure; in the air removal conduit; the apex level and the floor level of the transparent structure. |
| Pressure | Air pressure | In the first zone, within the transparent structure. |
| Power | Electricity generated | Power generation circuitry driven by air moving in the second direction in the air removal conduit. |

The control system comprises a processor, and a display to allow supervision of the system. The control system will control at least one actuator, which acts to control the first controllable opening of the transparent structure. Control of the first controllable opening regulates the inflow of air into the first zone.

The control system will operate according to an algorithm, to adapt the rate of air flow in the de-watering system to various conditions. Thus the control system will control the rate of evaporation of water from the de-watering system dynamically. The algorithm regulates the rate of flow of air through the first zone, and hence sets the selectable setting of the first controllable opening of the transparent structure, at least partly on the basis of an estimate of the rate of evaporation of water from the open upper surface of a de-watering bed. One example of a method to estimate the rate of evaporation may use a formula to estimate the evaporation rate, plus values of some of the measured variables in Table 1 above. Such a formula may take the form shown in Table 2 below.

TABLE 2

An example of a formula used to estimate evaporation rates
Formula: $g = \Theta \times A \times X$

| Variable | Meaning of variable in formula |
|---|---|
| g | Amount of evaporated water |
| Θ | Evaporation coefficient, which comprises variable v, the velocity of air above the water surface (m/s) |
| A | Water surface area ($m^2$) |
| X | Difference between the maximum and actual humidity ratio of the air |

In embodiments with multiple de-watering beds in the transparent structure, the formula may be applied separately to each bed, for example when the beds have different areas.

The above description refers to heated air from the first zone rising up the air removal conduit from the second opening of the transparent structure, and venting to the atmosphere. Here the 'heated air' will contain varying amounts of water, which has evaporated from the liquid industrial waste in the de-watering bed. Effectively, hot air, which may be saturated with water, will be vented to the atmosphere through the air removal conduit.

The above description refers to the control system being configured to continue de-watering the liquid industrial waste, until a selectable end point in the de-watering process has been reached. That selectable end point may be set as a desired residual water content in the liquid industrial waste, for example a residual water content equal to or less than 50%. However, the process may continue until the liquid industrial waste is essentially dry, or until very viscous residue remains in the de-watering bed. When the process continues until essentially all water has been removed from the liquid industrial waste, then the remaining residue in the de-watering bed may be essentially dry matter. That matter may have only 2-5% of the mass of the liquid industrial waste that was originally placed in the bed. The selectable end point may generally be chosen to yield residual liquid industrial waste with a water content or viscosity that enables further transport and disposal of the residual liquid industrial waste off-site.

FIG. 2

Figure 2:
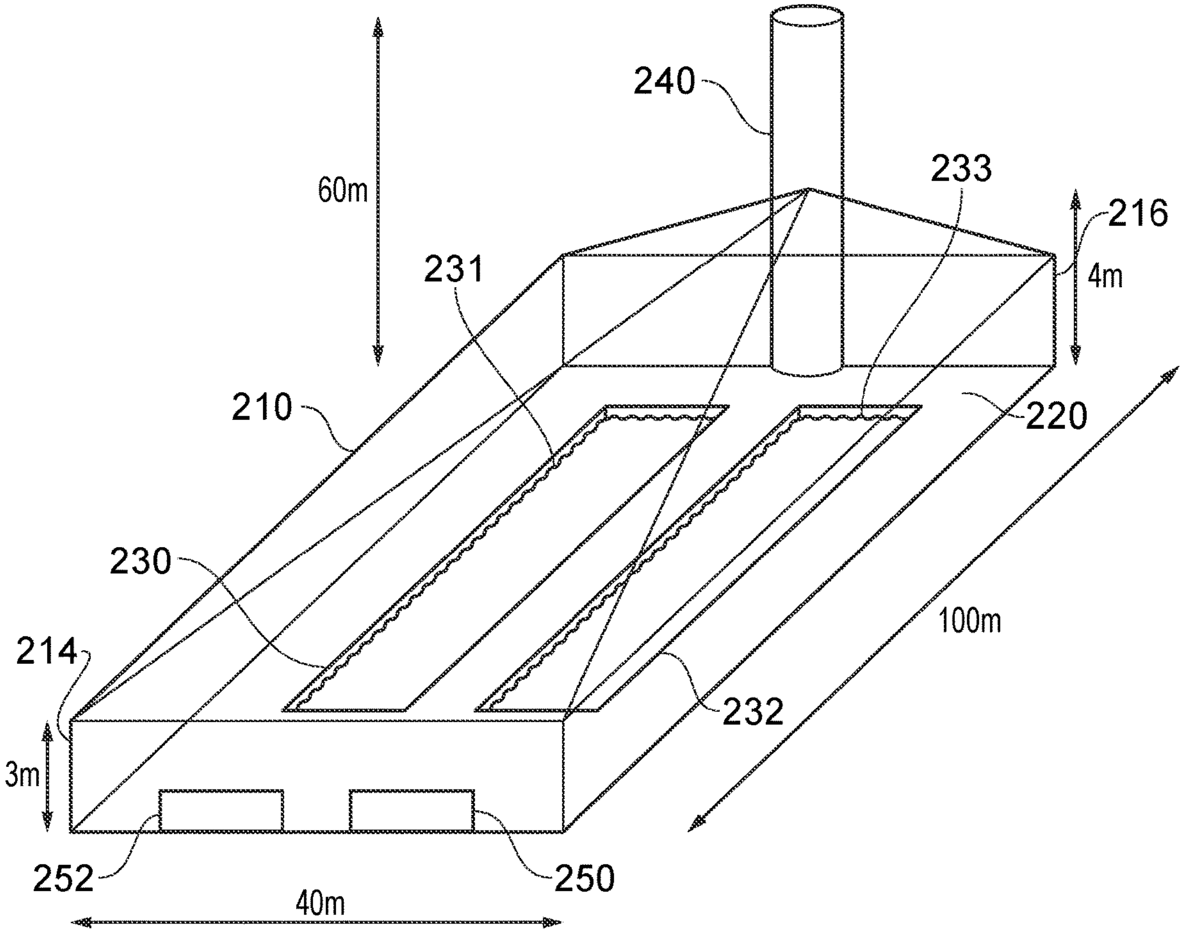
FIG. 2 is a perspective view of an example embodiment of the invention.

FIG. 2 illustrates an example of a de-watering system for processing liquid industrial waste, in accordance with example embodiments of the invention and as generally described above. In this example, a transparent structure 210 is shown. Transparent structure 210 encloses first zone 220. Transparent structure 210 is located outdoors, whereby air in first zone 220 is subject to solar heating during daytime. Transparent structure 210 has a first end 214 and a second end 216. In the example of FIG. 2, first end 214 and a second end 216 are opposite one another.

A first de-watering bed 230 and a second de-watering bed 232 are shown. The first de-watering bed 230 and the second de-watering bed 232 are configured to hold the liquid industrial waste.

The de-watering beds each have closed sides and a base, and are open at their upper surface. As shown in FIG. 2, the first de-watering bed 230 and the second de-watering bed 232 may be sunk into a floor of the transparent structure 210. Thus the positions of the references 230 and 232 shown on FIG. 2 indicate the open upper surface of each of first de-watering bed 230 and the second de-watering bed 232. The closed sides and the base of each of first de-watering bed 230 and the second de-watering bed 232 are not visible in FIG. 2, and are below floor level. A surface level of the liquid industrial waste 231 in first de-watering bed 230, and a surface level of the liquid industrial waste 233 in second de-watering bed 232, are also shown.

The transparent structure has a first controllable opening 250 and a second controllable opening 252, at first end 214 of transparent structure 210. Air removal conduit 240 is provided at second end 216 of transparent structure 210. Air removal conduit 240 is configured to allow heated air from first zone 220 to rise up the air removal conduit 240 from the first zone 220 of the transparent structure 210, and to vent to the atmosphere. The interior of the air removal conduit 240 can be considered to be a second zone, which is distinct and separate from the first zone 220, because air that passes into the air removal conduit 240 can no longer circulate or flow back into the first zone 220. Once entering air removal conduit 240, the air passes only upwards and out of the air removal conduit 240. The air removal conduit 240 can be located next to, but wholly outside the first zone 220, and simply be connected to second end 216 of transparent structure 210. Alternatively, air removal conduit 240 can stand at least partially within the first zone 220, and project up through a roof of the transparent structure 210. In some exemplary embodiments, air removal conduit 240 does not reach all the way down to the floor level of first zone 210.

The open upper surfaces of the first de-watering bed 230 and the second de-watering bed 232 are configured for water to evaporate from the liquid industrial waste 231, 233 into the heated air in the first zone 220. The water then passes through first zone 220 with the air flow in the first zone 220, i.e. in a first direction that lies from first end 214 of transparent structure 210 to second end 216 of transparent structure 210. The water then passes in a second direction up the air removal conduit 240 and vents to the atmosphere. The evaporation of water from the liquid industrial waste 231, 233 reduces the water content and the level of the liquid industrial waste 231, 233 in the beds of first de-watering bed 230 and second de-watering bed 232.

In order not to over-complicate FIG. 2, the applicant has provided separate figures to detail other aspects of embodiments of the de-watering system. In particular, a control system and sensors are illustrated and described with reference to FIGS. 3A, 14 and 15. Elements designed to enhance air flow and air temperature are illustrated and described with reference to FIGS. 3A, 3B, 4, 5A, 5B, 6A, 6B, 7A, 7B and 11. However, those elements, particularly the control system, are incorporated into FIG. 2.

The applicant has provided purely illustrative dimensions on FIG. 2. However, the de-watering system of FIG. 2 may be made with a wide variety of dimensions. The chosen dimensions may depend, for example, on the intended annual throughput of liquid industrial waste, and the likely air temperature that will be achieved with annual insolation values at the location where the de-watering system is constructed. The de-watering system can in one example have: a length 100 metres for the whole system; a width 40 metres; a height 2-3 metres at the near end; and a height 3-4 metres at the far end. The air removal conduit 240 may be 60 metres tall. With the dimensions shown on FIG. 2, the overall 'footprint' area of the de-watering system is of the order of 4,000 $m^2$. However, the de-watering system can easily be scaled to up to 10,000 $m^2$ or more.

The selectable end point of the de-watering process may be set in various ways. When the de-watering system comprises multiple de-watering beds, the selectable end point may be chosen to have a different value for the liquid industrial waste in each de-watering bed. The selectable end point can, in some exemplary embodiments, be based on knowledge of the detergent and waste components in a particular batch of liquid industrial waste that is being processed, and the concentration of these components that is desired at the end of the de-watering process. For example, the selectable endpoint may be set as a desired level of residual water content to allow easy transportation and transfer of the residual liquid industrial waste, by pumping. A lower water content may be set, if the residual liquid industrial waste is to be used in waste-to-energy operations. A further use of the residual liquid industrial waste is in concrete manufacturing plants as a fuel. Some concrete manufacturers work, for example, with input materials having a 30-50% water content. Other selectable endpoints may be chosen, based on anticipated needs of a subsequent waste product 'end user' who is typically at another location.

Although described as 'transparent' in connection with FIG. 2, transparent structure 210 may have frame elements that are opaque, and/or portions that are only substantially transparent. As can be seen from FIG. 2, the transparent structure acts to substantially enclose and allow control of air within the first zone, subject to the settings of first controllable opening 250, second controllable opening 252, and the size of an opening into air removal conduit 240. In embodiments of the invention with multiple de-watering beds located in the first zone 220, such as first de-watering bed 230 and second de-watering bed 232, the system can be operated with liquid industrial waste that is at different stages of de-watering in each de-watering bed. Although the example of FIG. 2 shows first end 214 and second end 216 opposite one another, and forming the shortest sides of transparent structure 210, other configurations are conceivable. If the first end 214 were one of the longer sides of the transparent structure 210, then more than one air removal conduit 240 might be provided at the opposing second end 216. An alternative shape of transparent structure 210 might have a different shape, in plan view, for example a trapezoid.

Figure 3A:
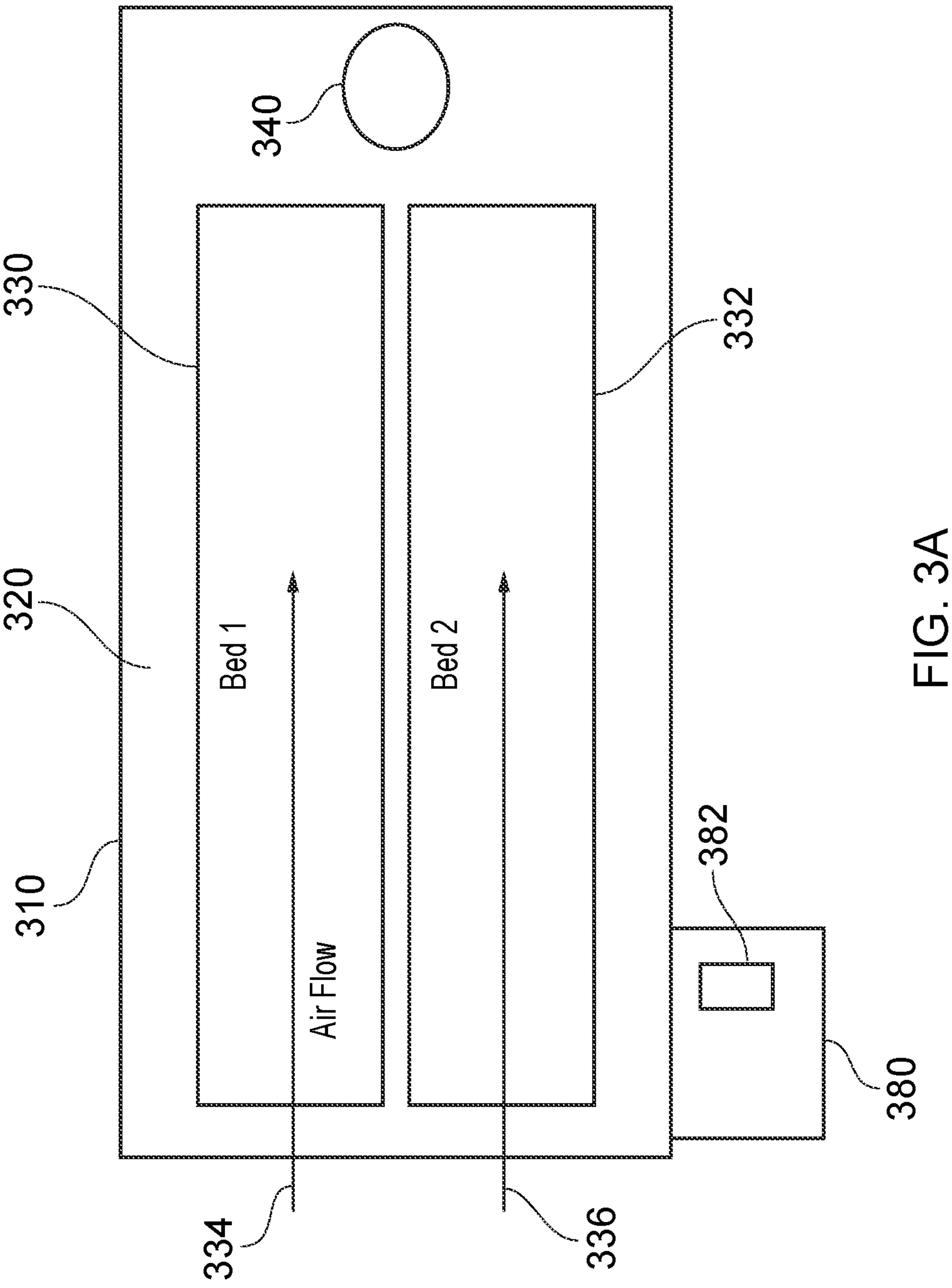
FIG. 3A is a plan view, showing air flow in the example embodiment of the invention of FIG. 2.
Figure 3B:
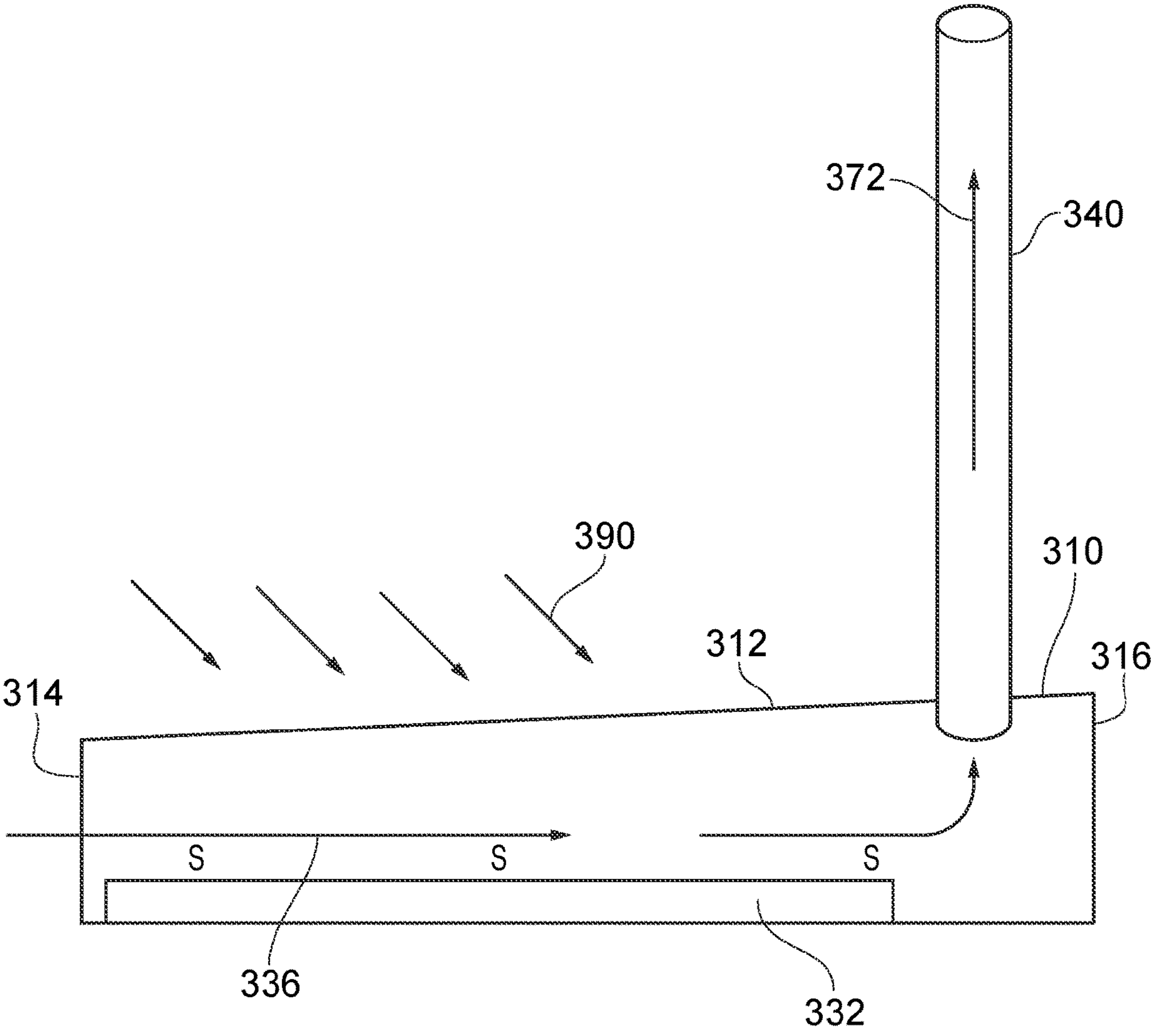
FIG. 3B is a side elevation view of the example embodiment of the invention of FIG. 3A, illustrating air flow and solar heating.

FIGS. 3A and 3B

FIG. 3A shows a plan view, specifically illustrating air flow in the embodiment of the invention of FIG. 2. FIG. 3A also shows the control system that is used, but was not shown, in FIG. 2.

FIG. 3A shows transparent structure 310 and first zone 320. Air removal conduit 340 is also shown in plan view. In this embodiment, air removal conduit 340 lies within the perimeter of transparent structure 310. First zone 320 contains first de-watering bed 330 and second de-watering bed 332.

A first flow of air 334 is shown passing over the open upper surface of first de-watering bed 330. A second flow of air 336 is shown passing over the open upper surface of second de-watering bed 332. First flow of air 334 and second flow of air 336 result from the air that enters the system through first controllable opening 250 and second controllable opening 252 in FIG. 2, for example. Alternatively, first flow of air 334 and second flow of air 336 may be supplied by a single controllable opening.

Control system 380 is used with the embodiment of FIG. 3A. The control system functions as described above in relation to Table 2. Control system 380 comprises a microprocessor or microcontroller, and also incorporates a display 382. The control system is configured to selectively open the first controllable opening 250 and the second controllable opening 252 shown at the first end of the transparent structure 210 of FIG. 2, to regulate a rate of flow of air through first zone 220. In addition, the control system 380 is configured to continue de-watering the liquid industrial waste, until reaching the selectable end point in the de-watering process.

FIG. 3B provides a side elevation cross-sectional view of the de-watering system of FIG. 3A. FIG. 3B is specifically provided to illustrate solar heating, i.e. insolation of sunlight through the roof of the transparent structure 310.

FIG. 3B shows transparent structure 310, first zone 320 and air removal conduit 340 of FIG. 3A. Arrow 336 indicates the direction of the second flow of air 336 shown in FIG. 3A, which is also the direction of flow of the first flow of air 334. Second direction 372 shows the direction in which the air flows when it has entered air removal conduit 340, thereby carrying evaporated water out to the atmosphere.

Transparent structure 310 is shown with a roof 312. Also shown are the first end 314 and the second end 316 of transparent structure 310. Incident sunlight is shown at 390. The incident sunlight 390 enters transparent structure 310 via roof 312. Roof 312 of transparent structure 310 is shown sloping. First end 314 of the transparent structure 310 is lower than second end 316 of the transparent structure. In an embodiment in which at least part of a roof 312 of the transparent structure forms a slope, the slope enhances the flow of the heated air in the first direction shown by arrow 336, i.e. from first end 314 of the transparent structure to second end 316 of the transparent structure 310, and hence to air removal conduit 340. Although roof 312 of transparent structure 310 is shown sloping, it may take other forms in other embodiments. For example, only part of roof 312 may slope, it may have a varying slope over different portions, or may be flat.

FIG. 4

Figure 4:
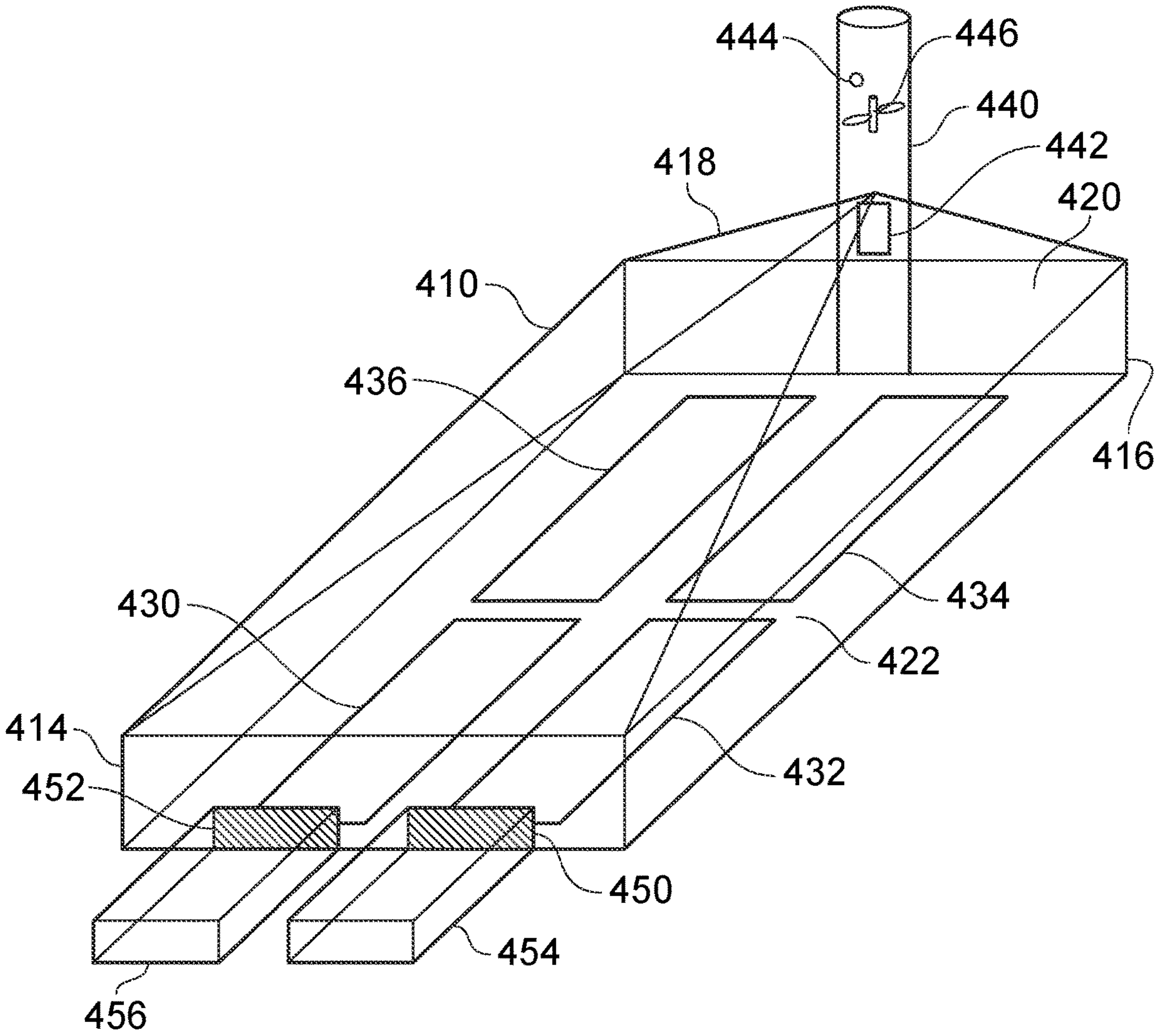
FIG. 4 is a perspective view of an example embodiment of the invention.

FIG. 4 is a front perspective view of an embodiment of the invention. Transparent structure 410 encloses first zone 420. Also shown is a floor 422 of transparent structure 410.

Transparent structure 410 has first end 414, second end 416 and roof 418. Roof 418 of transparent structure 410 forms a slope. The first end 414 of transparent structure 410 is lower than second end 416 of transparent structure 410. The slope of roof 418 is configured to enhance the flow of the heated air in the first direction, from the first end 414 of transparent structure 410 to the second end 416 of transparent structure 410, and hence the flow of air to the air removal conduit 440. Roof 418 also slopes upwards, from the long sides of the transparent structure 410 towards the centre line of roof 418. Roof 418 has its highest point at an apex where roof 418 joins to air removal conduit 440.

The embodiment of FIG. 4 shows first de-watering bed 430, second de-watering bed 432, third de-watering bed 434 and fourth de-watering bed 436. Once again, the open upper surface of each bed is shown, with the remainder of each bed sunk into floor 422.

An inlet 442 to the air removal conduit 440 is shown. Inlet 442 is located at an upper portion of the second end 416 of the transparent structure 410. A venturi 444 in the air removal conduit is positioned and/or configured to decrease internal pressure within air removal conduit 440, in times of high winds outside the air removal conduit 440. Several venturis such as venturi 444 may be placed at different locations towards the upper end of air removal conduit 440, to improve the overall function of air removal conduit 440 at windy sites and/or during windy periods.

An energy capture system 446 is located within air removal conduit 440. The energy capture system 446 is configured to convert the kinetic energy of the heated air moving in the second direction in air removal conduit 440 into electrical energy. That electrical energy can power the control and sensor systems throughout the system. Energy capture system 446 may take the form of a simple turbine blade that rotates within, and is aligned with, air removal conduit 440.

A first controllable opening 450 and a second controllable opening 452 are shown in first end 414 of transparent structure 410. A first pre-heating chamber 454 is located at the first end 414 of transparent structure 410. The first pre-heating chamber 454 is outside the transparent structure 410, and is aligned with the first controllable opening 450. The first pre-heating chamber 454 is arranged to pre-heat air, and to supply the pre-heated air to the first controllable opening 450. Similarly, second pre-heating chamber 456 is arranged to pre-heat air, and to supply the pre-heated air to the second controllable opening 452.

In a purely illustrative example, first de-watering bed 430, second de-watering bed 432, third de-watering bed 434 and fourth de-watering bed 436 may be 70 metres in length, and 14 metres wide. However, in an embodiment with two beds, the long dimension may be 70 metres, and the width 35 metres. The temperature range inside the transparent structure may, in operation, be in the range of 5-25° C. above the outside air temperature. In a sunny location, this would be a temperature within first zone 420 in the range of 10-65° C., partly depending on season. The pressure in the first zone is close to the external air pressure.

First de-watering bed 430, second de-watering bed 432, third de-watering bed 434 and fourth de-watering bed 436 may be operated with liquid industrial waste that is at different stages of de-watering in each de-watering bed. Table 3 below provides a non-limiting numerical example of the values of a level of liquid industrial waste and a water content of the liquid industrial waste, for various consignments of liquid industrial waste that have been added to the four beds on various days. This example is provided in order to make clear the relationship between the initial water content of the liquid industrial waste, subsequent values of the water content, the depth of the liquid industrial waste in each bed during processing, and the number of days of processing that have elapsed.

TABLE 3

Examples of variables in the de-watering system.

| | Measurements for the liquid industrial waste in each bed | | | |
|---|---|---|---|---|
| Bed number | Initial % water content | Number of completed days of de-watering | Current % water content | Approx. measured level of liquid in bed, as a % of initial level |
| 430 | 95% | 6 | 85 | 30% |
| 432 | 95% | 7 | 75 | 20% |
| 434 | 90% | 6 | 60 | 25% |
| 436 | 90% | 7 | 50 | 20% |

The values for 'Current % water content' appear to fall only slowly. This can be understood by considering one row in detail. The row for fourth de-watering bed 436 shows that fourth de-watering bed 436 was filled, seven days ago, with an initial batch of liquid industrial waste having a water content of 90%. After seven completed days of de-watering, much of the initial water content has evaporated. For each 1000 litres of the initial batch of liquid industrial waste, there were: 900 litres of water; and the other 100 litres comprised the various detergents and waste matter that were left over from the industrial cleaning process. When seven days of processing have elapsed, 800 litres of water has evaporated from the initial 900 litres of water. Thus the remaining volume of the liquid industrial waste after seven days now has just 100 litres of water, and still has the original 100 litres of detergents and waste matter from the industrial cleaning process. The resulting value for fourth de-watering bed 436 in the third column of table 3 is a current % water content of 50%, because half of the remaining liquid industrial waste is still water. So, although the values in the third column of Table 3 appear to fall only slowly, the quantity of water lost to evaporation is a very large percentage of the initial volume of the liquid industrial waste.

Further considering the example above, the final column in the table for fourth de-watering bed 436 correctly indicates that the 'Approx. measured level of liquid in bed as a % of initial level' is 20%. The combined total of 100 litres of water and the original 100 litres of detergents and waste matter in de-watering bed 436, is a total of 200 litres. That 200 litres is 20% of the original volume of 1000 litres of liquid industrial waste that was initially added to fourth de-watering bed 436 for processing.

In general terms, when considering the current concentration of the waste in any de-watering bed, the concentration can be measured by the height of the liquid industrial waste in the dewatering bed. The formula to relate the depth of the liquid industrial waste and the concentration of the waste is:

$$C = \frac{CI \times hI}{hx}$$

C is current concentration of waste content (1-water content)

CI is initial concentration of waste content hI is initial height of liquid from the base of the de-watering bed hx is current height of liquid from the base of the de-watering bed The above variables hI and hx assume a cuboid shape of de-watering bed, with a constant cross-sectional area at each depth. Only with such a shape of the de-watering bed is the height of the liquid industrial waste in the bed a linear measure of the volume.

For table 3 above, in this format the calculation becomes:

$$\frac{CI}{C} = \frac{hx}{hI}$$

So this yields the ratio of the concentrations as a ratio (hx/hI), which relates to measured levels of liquid industrial waste in the bed, as a %. Notably, this calculation is presented in a format that is based on the concentration of waste, not on the percentage of water.

In the examples described herein, the initial percentage of water in the liquid industrial waste can be determined in various ways. The initial percentage of water in the liquid industrial waste may be determined by sending a sample of the liquid industrial waste to a laboratory. In contrast, it may be determined in-situ, when the liquid industrial waste is put into the de-watering bed, or when the liquid industrial waste is in an 'acceptance tank'. An acceptance tank may be used to hold the liquid industrial waste when it is delivered to the processing site, before treatment to de-water the liquid industrial waste takes place. See also the discussion of FIG. 8.

The selectable end point of the de-watering process may be set in a variety of ways. In turn, the control system of the invention may determine that the end point of the dewatering process has been reached, in a variety of ways. FIG. 3A showed control system 380. Control system 380 is configured to receive measurement values from a liquid level sensor in the at least one de-watering bed. Further details of this arrangement are described in connection with later Figs.

The liquid level sensor provides measurements of the level of the liquid industrial waste in the at least one de-watering bed, at various times. Using these measurements, the control system is configured to determine a change in the level of the liquid industrial waste, from a first measured initial value of the level of the liquid industrial waste, to a subsequent second measured value of the level of the liquid industrial waste after de-watering. The selectable end point in the de-watering process may be a selectable maximum value of residual water content in the liquid industrial waste after de-watering. In this case, the control system is configured to determine that the selectable end point in the de-watering process has been reached, on the basis of:

(i) the initial value of water content of the liquid industrial waste; and (ii) the change in the level of the liquid industrial waste.

Notably, Table 3 above and the formulae discussed below Table 3 make clear the relation between the level of liquid industrial waste in the de-watering bed and the percentage of water in that liquid industrial waste.

In one example, the initial value of water content of the liquid industrial waste may be at least 90% by volume. Table 3 gives examples of initial water content values of 90% by volume and 95% by volume. Starting from these initial levels of water content, the control system may be configured to continue de-watering the liquid industrial waste until reaching an end point with the liquid industrial waste having a residual water content of no more than 50% by volume. The remaining 50% by volume comprises the detergents and the waste matter from the industrial cleaning process. In this example, the initial water content of 95% corresponds to 19 parts water to 1 part of combined detergent and industrial waste. The selectable end point corresponds to equal parts of water, and of the combined detergent and industrial waste.

First de-watering bed 430, second de-watering bed 432, third de-watering bed 434 and fourth de-watering bed 436 may be made of concrete. That concrete may be 'bunded', i.e. provided with a liquid-proof lining under its base and sides. All of floor 422 may be concrete. That concrete may be painted black, in order to increase the uptake of solar energy by day. A black surface will also ensure increased re-radiation of heat from floor 422 into the air within transparent structure 410 by night. Floor 422 forms a 'thermal mass' within transparent structure 410.

Any internal thermal mass within first zone 420 takes up heat while the sun is shining, and then re-radiates that heat into air in the enclosed first zone 420 of the transparent structure 410. This enables the de-watering operation to continue during the hours of darkness. The liquid industrial waste itself provides thermal mass, because of the high specific heat capacity of water. The blackened concrete floor 422 may provide a significant part of the thermal mass. Insulation may be provided under concrete floor 422, in order to minimise the leakage of heat from the lower surface of concrete floor 422. In an embodiment where the beds are not sunk into blackened concrete floor 422, the beds are supported above floor 422 on concrete beds or plinths, to provide additional thermal mass. A concrete bed or plinth under the de-watering bed within the first zone 420 would be arranged to receive direct solar heating during daytime, and also be heated by the passage of the heated air through the first zone 420.

Additional thermal mass, comprising portable vessels such as drums, barrels or bags containing water, can be put in the first zone 420. This additional thermal mass can be moved depending on the season, for example placed against a northern wall in winter. Such additional thermal mass may also be painted black, to take up heat. There may be periods when one or more of the de-watering beds is empty, or contains only a low volume of liquid industrial waste. In that case, this additional thermal mass may provide a significant increase in the system's ability to take up and retain heat, pending re-filling of the de-watering beds.

Summarising the effects of each form of thermal mass described above, the thermal mass is configured to be exposed to solar heating in the first zone 420 during daytime. Solar heating increases the temperature of the thermal mass during daytime, and then the thermal mass emits the stored heat during the night. This enables continued evaporation of water from the liquid industrial waste in the de-watering bed during the night, or during periods of low solar insolation. In turn, this increases the operating efficiency of the de-watering process, for any given floor area of the system.

The throughput of liquid industrial waste for de-watering depends on annual sunlight as well as climatic conditions. If the system is installed in a cloud free location near the tropics, the throughput will be higher than at northern or southern latitudes. The total volume of liquid industrial waste that may be treated in the de-watering system might be of the order of 10,000 tonnes per year. However, that amount of this form of liquid industrial waste might be a large fraction of all such waste produced by a large EU country. This volume of liquid industrial waste is orders of magnitude lower than the municipal waste, i.e the domestic/public waste/sewage, that is produced in such a country. The system of the present application can easily be scaled up or down. A smaller plant might be deployed in a country with less need. A plant for larger throughput can be created by including more or larger de-watering beds, or multiple transparent structures. Multiple transparent structures offer a degree of redundancy.

Air removal conduit 440 in FIG. 4 is configured to allow heated air from the first zone to rise up air removal conduit 440. The provision of air removal conduit 440 increases the air velocity across the surface of the liquid industrial waste. The performance of the air removal conduit 440 is dependent on the Boussinesq approximation, i.e. the 'stack' formula, which enables a calculation of such specific parameters as the diameter of the air removal conduit 440.

The invention provides an advantage, in that it is not subject to the problem of the corrosion of seals that may occur with the known evapo-concentrator 100 of FIG. 1. The present invention obviates a tendency in some known evapo-concentrators, whereby a small percentage of solvents in the liquid industrial waste can cause plastic or rubber parts of the evapo-concentrator to swell or deteriorate.

Figure 5A:
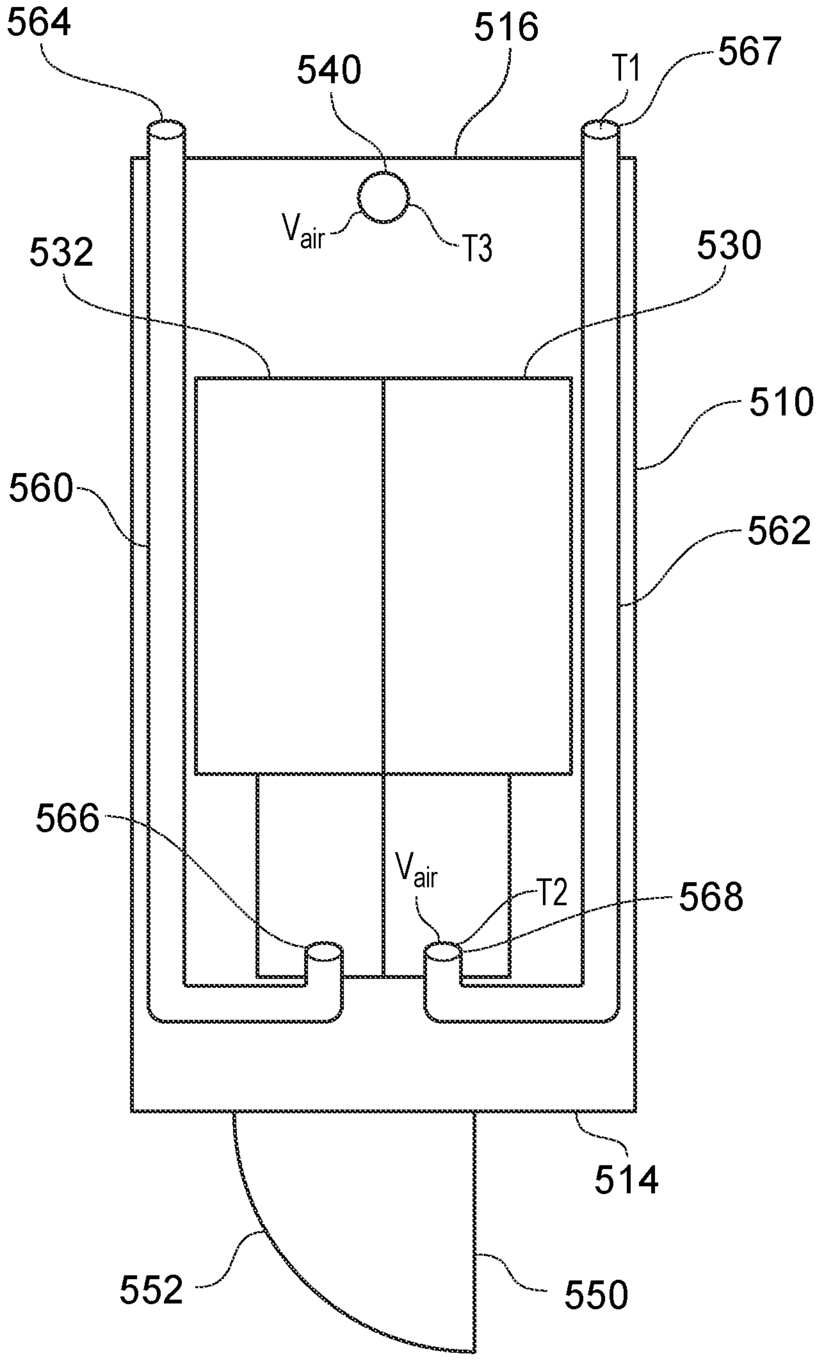
FIG. 5A and FIG. 5B provide plan and side elevation views of an example embodiment of the invention.
Figure 5B:
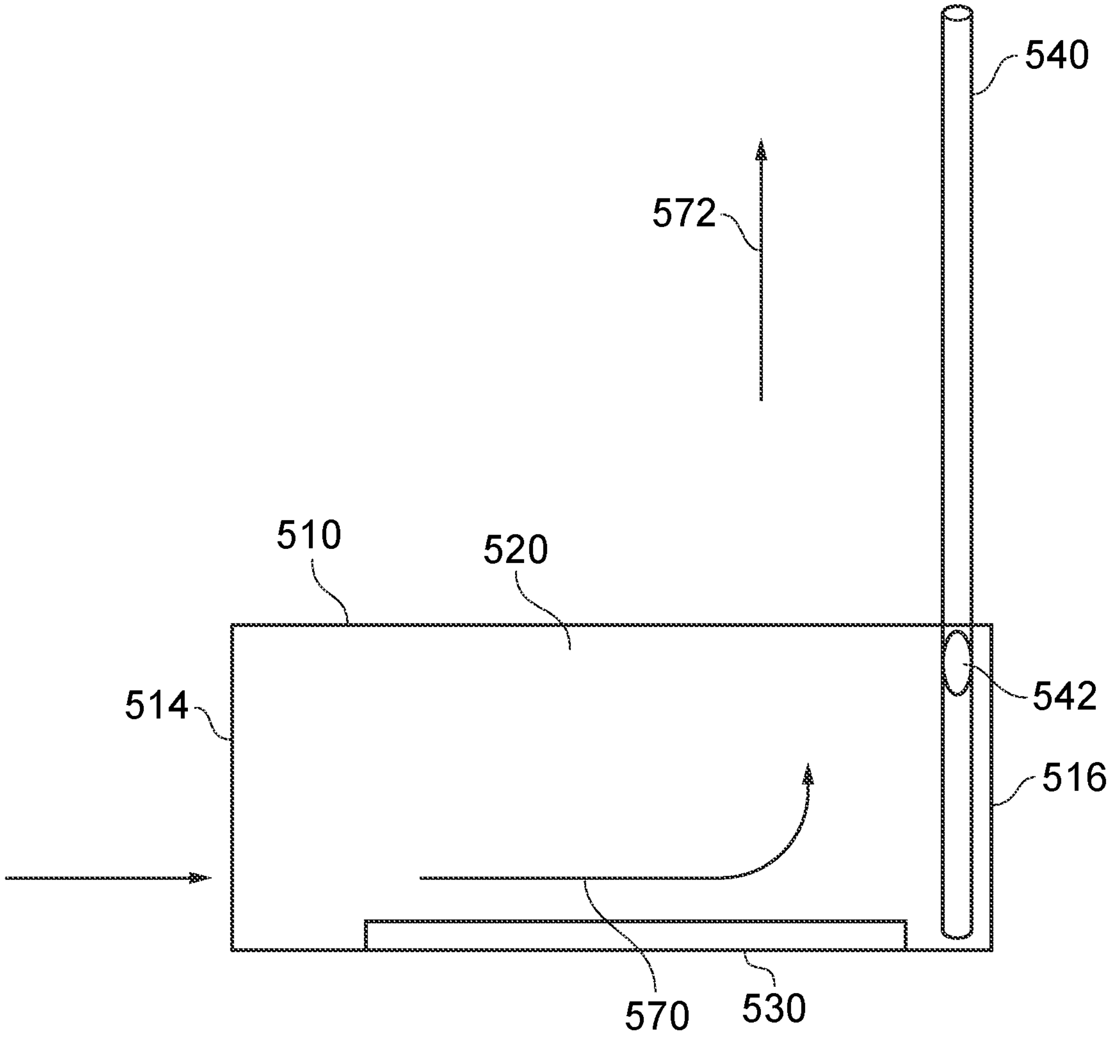

FIG. 5A and FIG. 5B

FIG. 5A provides a plan view of an embodiment of the invention. FIG. 5B provides a cross-sectional side elevation view of the embodiment of FIG. 5A.

Transparent structure 510 is shown. Transparent structure 510 has a first end 514 and a second end 516. Transparent structure 510 encloses a first zone 520, as referenced on FIG. 5B. A first de-watering bed 530 is located low down in the first zone 520, as can be seen from FIG. 5B. As shown in the plan view of FIG. 5A, first zone 520 also contains a second de-watering bed 532.

A controllable opening 550 at first end 514 opens over a range of movement 552. Controllable opening 550 serves to regulate a rate of flow of air through first zone 520. Controllable opening 550 may also be configured as a door, to allow access for personnel to the first zone 520.

Air removal conduit 540 is shown at the second end 516 in FIG. 5A. An opening 542 allows air in the first zone 520 to pass into the air removal conduit 540, see FIG. 5B. Air passes upwards within air removal conduit 540 in the marked second direction 572.

A first feeder tube 560 for air is shown at the left edge and at the lower centre of FIG. 5A. A second feeder tube 562 for air is shown at the right edge and at the lower centre of FIG. 5A. The first feeder tube 560 conveys air from outside the transparent structure, with a first input opening 564 and a first output opening 566. The second feeder tube 562 conveys air from outside the transparent structure, with a second input opening 567 and a second output opening 568.

The control system 380, as shown in FIG. 3A, uses inputs of temperature and absolute air humidity, as part of the decision process that underlies operation of the controllable opening 550. The locations of various temperature sensors T1, T2 and T3 are shown on FIG. 5A. Temperature sensor T1 is shown at the second input opening 567. Temperature sensor T2 is shown at the second output opening 568. Temperature sensor T3 is shown at the entrance to air removal conduit 540. These temperature sensors feed data to the control system 380. Temperature sensors T1 and T2 provide a measure of the temperature of the 'input' air to the system.

Thus FIG. 5A shows first feeder tube 560 configured to provide hot air to the liquid industrial waste in second de-watering bed 532. Second feeder tube 562 is configured to provide hot air to the liquid industrial waste in first de-watering bed 530. An alternative arrangement not illustrated in FIG. 5A comprises an extension of the feeder tubes into the beds, with the extended feeder tubes further configured to bubble the hot air through the de-watering beds. See also FIG. 12. An aeration nozzle may be provided in the form of a porous steel tube. The tube may run through each bed, segmented in 1 m lengths. Alternatively, an array of aeration discs may be used.

Most forms of liquid industrial waste can be aerated without difficulty, and without significant odour generation, in contrast to typical municipal waste streams. Bacteria in the liquid industrial waste may act to break down any organic matter that is in the liquid industrial waste. In general, anaerobic bacteria tend to produce strong odours, and aerobic bacteria have less tendency to produce bad odours. A biocide can be added to the de-watering beds, should any bacteria that are present start to create odours.

In some embodiments, agitators, stirrers, mixers, rods, a pump, and/or another form of agitator may also be provided in each de-watering bed, to agitate the liquid industrial waste. The action of the agitator is to agitate the liquid industrial waste, thereby ensuring that water can evaporate from different portions of the liquid industrial waste at the open upper surface of the de-watering bed.

In an alternative to the design illustrated in FIG. 5A, at least one of first feeder tube 560 and second feeder tube 562 can be configured to pass through the de-watering bed, without releasing air into the liquid industrial waste. Instead, the at least one feeder tube releases heat through walls of the feeder tube, from hot air in the feeder tube, to the liquid industrial waste in the de-watering bed. See for example FIG. 19, described later.

In operation, solar heating warms air within the first zone 520. Thus air from outside transparent structure 510 is heated during its passage through the first feeder tube 560 and the second feeder tube 562. When the air is released through the first output opening 566 and the second output opening 568, it will have been heated. The air then passes over first de-watering bed 530 and second de-watering bed 532, in the first direction 570 indicated with an arrow in FIG. 5B. See again the detailed air flow diagram FIG. 3A. The heated air will pick up water vapour from the liquid industrial waste, that is within the first de-watering bed 530 and the second de-watering bed 532, from the open upper surfaces of the first de-watering bed 530 and the second de-watering bed 532.

The moisture-laden hot air will pass through opening 542 into air removal conduit 540. The hot air will then pass in second direction 572 up through the air removal conduit 540. The air then vents to the atmosphere through the open top of the air removal conduit 540.

Figure 6B:
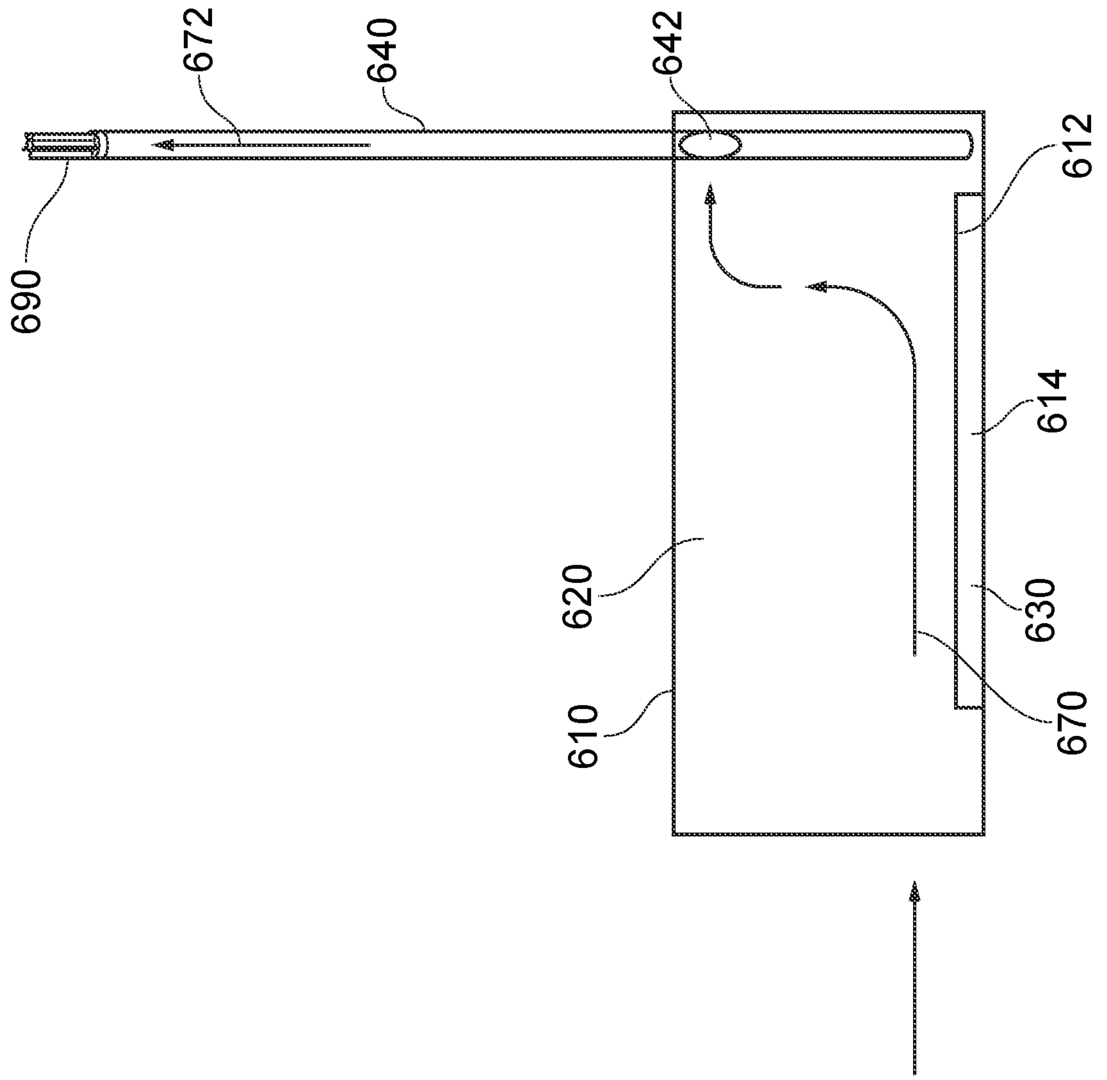
FIG. 6A and FIG. 6B provide plan and side elevation views of an example embodiment of the invention.
Figure 6A:
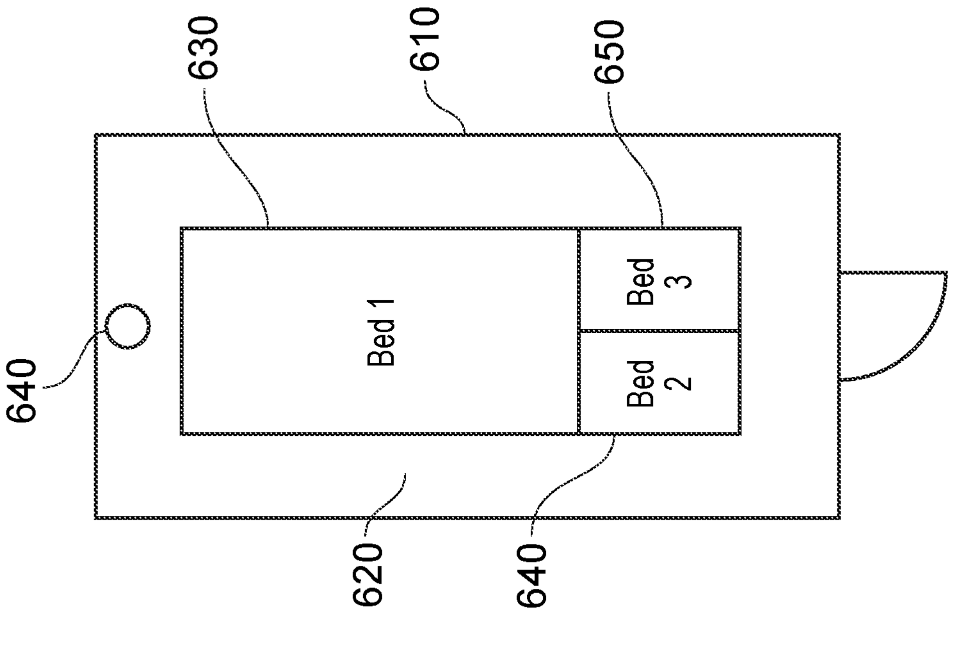

FIG. 6A and FIG. 6B

FIG. 6A and FIG. 6B provide plan and side elevation views of an embodiment of the invention.

Transparent structure 610 and first zone 620 are shown. First bed 630, second bed 640 and third bed 650 are shown. The de-watering beds may serve different purposes. For example, the liquid industrial waste may be partially de-watered in one de-watering bed, before being transferred to another de-watering bed. Thus the de-watering may be a 'stepped' process.

Air removal conduit 640 is shown in FIG. 6B. A first direction of air movement 670 within first zone 620 is shown. Second direction 672 of air movement in air removal conduit 640 is also shown, after air passes through inlet 642. In the embodiment of FIG. 6B, the roof does not slope.

FIG. 6B shows a side elevation view of first de-watering bed 630 and third de-watering bed 650. Reference 614 shows a closed side of the de-watering beds. Reference 612 indicates the open upper surface of the de-watering beds. Upper surface 612 is open in order to allow water from the liquid industrial waste in the de-watering bed to evaporate into heated air in the first zone 620. The beds may be partially or entirely above a floor level of first zone 620, in this embodiment.

A device may be included to allow the transfer of horizontal wind energy outside the transparent structure 610, above air removal conduit 640, into a vertical airflow. An example of such a device is a vertical axis H blade wind turbine 690, with horizontal ventilator blades. Vertical axis H blade wind turbine 690 is shown mounted at the top of air removal conduit 640 in FIG. 6B. The purpose of vertical axis H blade wind turbine 690 is to further assist in the transfer of air from the first zone 620 through the air removal conduit 640. When wind blows across the top of air removal conduit 640, rotation of the vertical axis H blade wind turbine 690 draws air in the second direction 672 up through the air removal conduit 640.

Figure 7B:
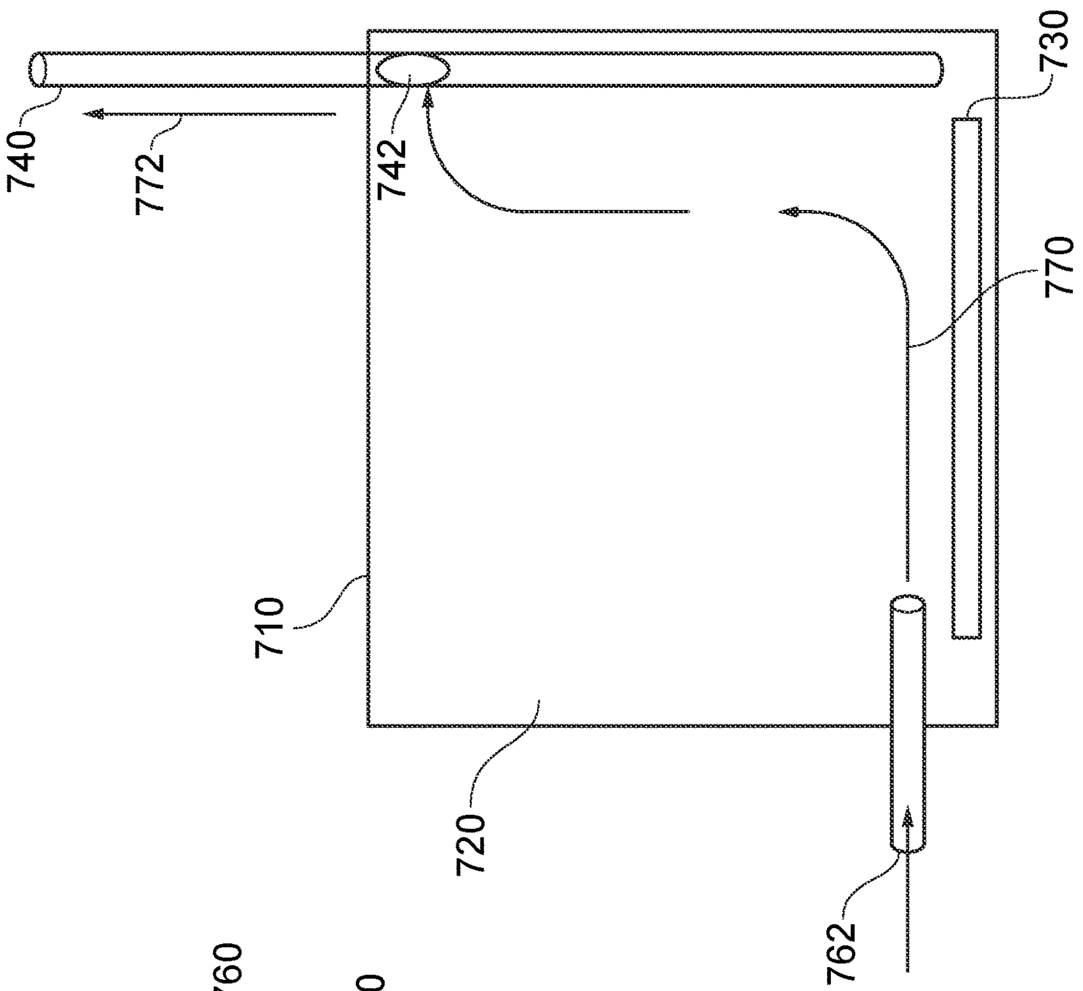
FIG. 7A and FIG. 7B provide plan and side elevation views of an example embodiment of the invention.
Figure 7A:
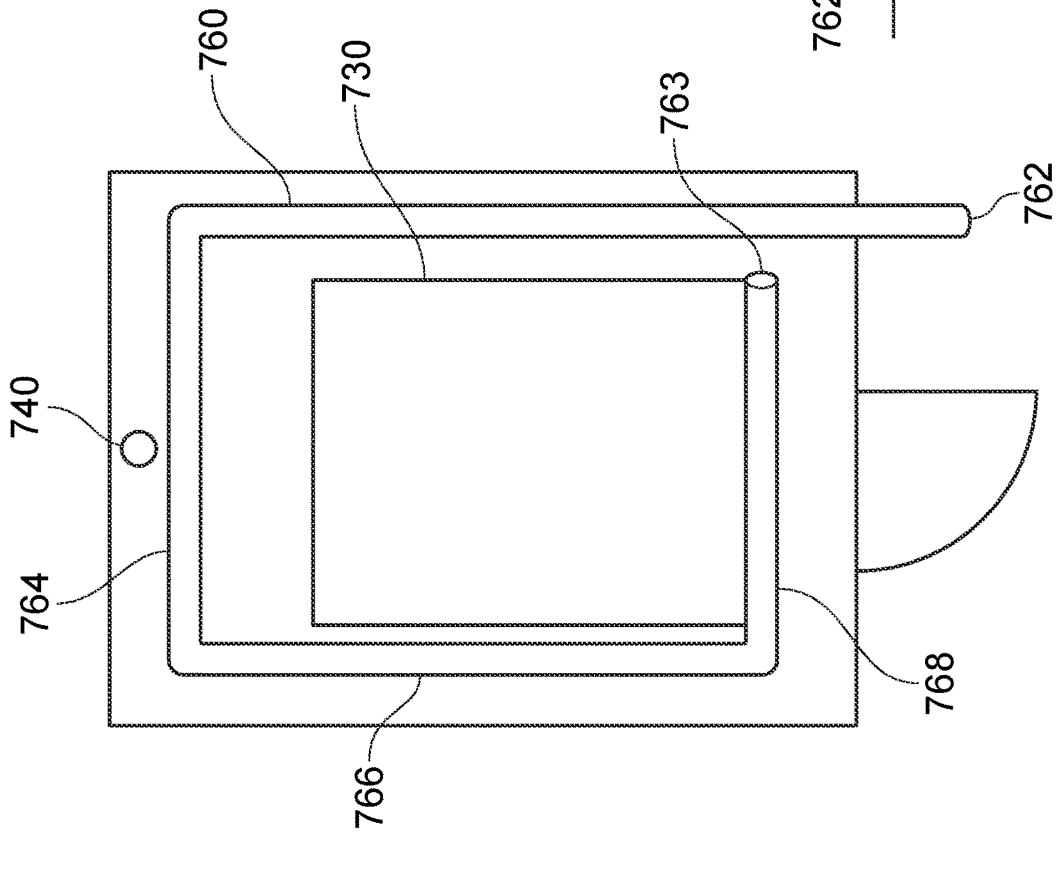

FIG. 7A and FIG. 7B

FIG. 7A provides a plan view of an embodiment of a de-watering system in accordance with the invention. FIG. 7B provides a side elevation cross-sectional view of the de-watering system of FIG. 7A.

Transparent structure 710, referenced in FIG. 7B, encloses first zone 720. Air removal conduit 740 has opening 742, which allows hot air to enter the air removal conduit 740. The first direction 770 of air flow is indicated. The second direction 772 in which air flows up the air removal conduit 740 is indicated as a vertical arrow.

A single de-watering bed 730 is shown. In the embodiment, a single feeder tube 760 is shown, with a first end 762 and a second end 763. First end 762 allows air from outside transparent structure 710 to enter the feeder tube 760. The air passes along feeder tube 760 through a second section 764, a third section 766 and a fourth section 768. The second section 764, third section 766 and fourth section 768 are all within the transparent structure 710, so the air in feeder tube 760 is heated during its passage through these sections of the feeder tube 760. Heated air will exit the fourth section 768 of the feeder tube 760 via second end 763. The first end 762 and second end 763 of feeder tube 760 may be provided with temperature sensors, not shown, as was previously described in relation to FIG. 5A. Measurements of air temperature at first end 762 and second end 763 of feeder tube 760 are fed to the control system 380 of FIG. 3A.

The heated air from second end 763 of the feeder tube 760 will then pass over the de-watering bed 730 and pick up moisture from the liquid industrial waste in de-watering bed 730. The heated, moist air passes in first direction 770 to the opening 742 in air removal conduit 740. The air then passes in second direction 772 and vents out into the atmosphere from the top of air removal conduit 740.

FIG. 8

Figure 8:
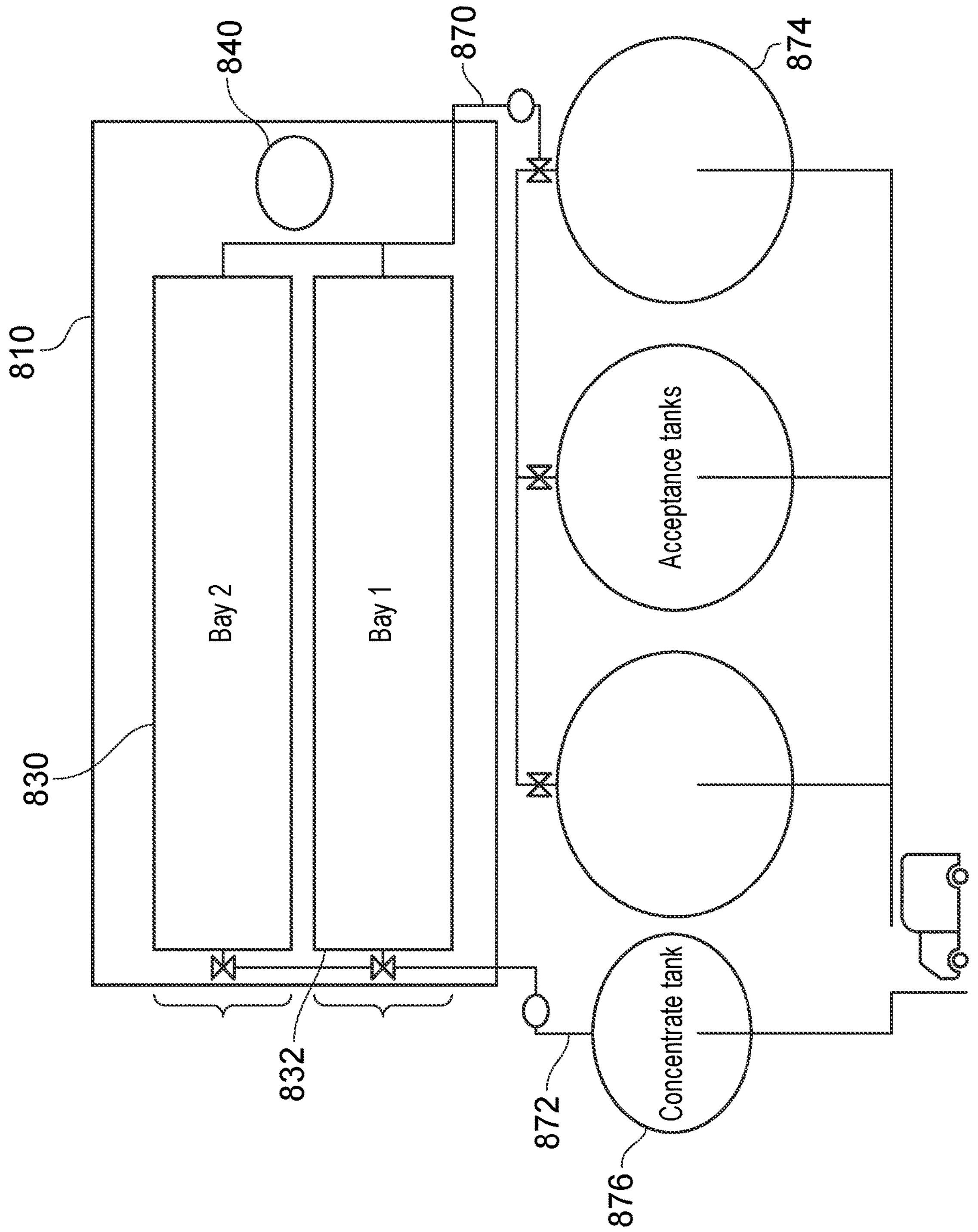
FIG. 8 is a schematic plan view of an example system, and of further equipment for moving fluids to and from the system.

FIG. 8 is a schematic plan view of the system of the invention, and of equipment for moving fluids to and from the system. Transparent structure 810 is shown at the top of FIG. 8. Air removal conduit 840 is shown at the right of FIG. 8. A first de-watering bed 830 and a second de-watering bed 832 are shown.

First pipework 870 and second pipework 872 are provided. Various sections of first pipework 870 bring liquid industrial waste to the first de-watering bed 830 and the second de-watering bed 832. Various sections of second pipework 872 remove the waste residue from the first de-watering bed 830 and the second de-watering bed 832, after de-watering of the liquid industrial waste. First pipework 870 and second pipework 872 may include pumps.

An 'acceptance tank' 874 holds liquid industrial waste that may have been brought to the site by lorry for processing. Multiple acceptance tanks 874 may be provided, as shown in FIG. 8. When the liquid industrial waste has been de-watered, the volume of residue will be less than the liquid industrial waste that was initially supplied as an input. A single 'concentrate tank' 876 is shown. Concentrate tank 876 receives liquid industrial waste that has been treated by de-watering in first de-watering bed 830 and second de-watering bed 832.

FIG. 9

Figure 9:
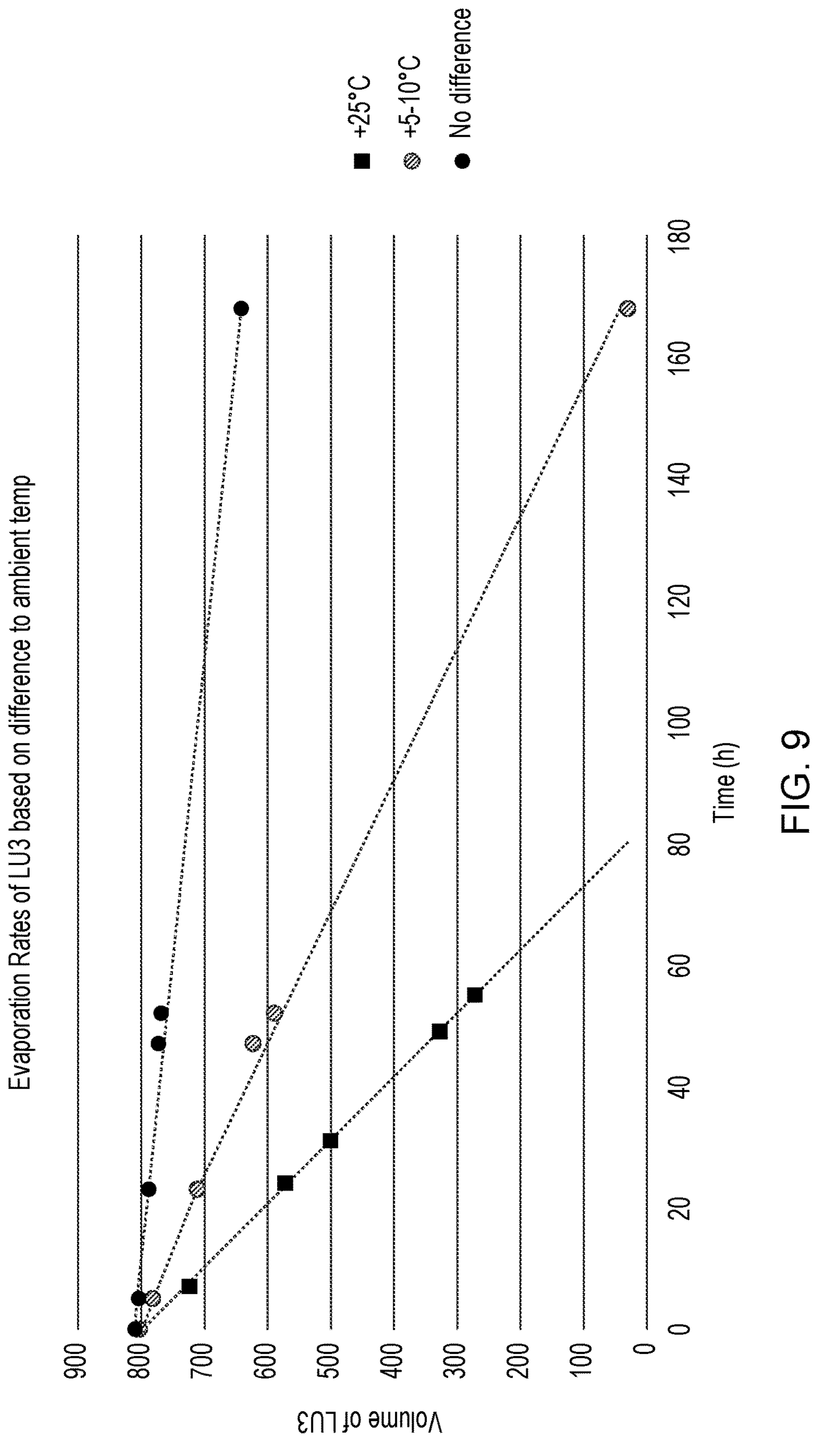
FIG. 9 is a graph illustrating measured evaporation rates.

FIG. 9 is a graph illustrating measured evaporation rates.

The graph shows the evaporation rates under various temperature conditions. The volume of liquid industrial waste is shown on the y-axis, with time in hours on the x-axis.

The evaporation rates are shown for liquid industrial waste at temperatures of 25 C above ambient, 5-10 C above ambient, and a further plot for a condition where there was no difference between operational temperature and ambient temperature. When the transparent structure of the invention achieves a temperature of 25 C above ambient, in particular, the evaporation rate increases significantly. The time of 80 hours shown for removal of most water at the 25 C operating condition might correspond, for example, to 5-15 days of operation of the de-watering system, see again column two 'Number of completed days of de-watering' of Table 3 above.

FIG. 10

Figure 10:
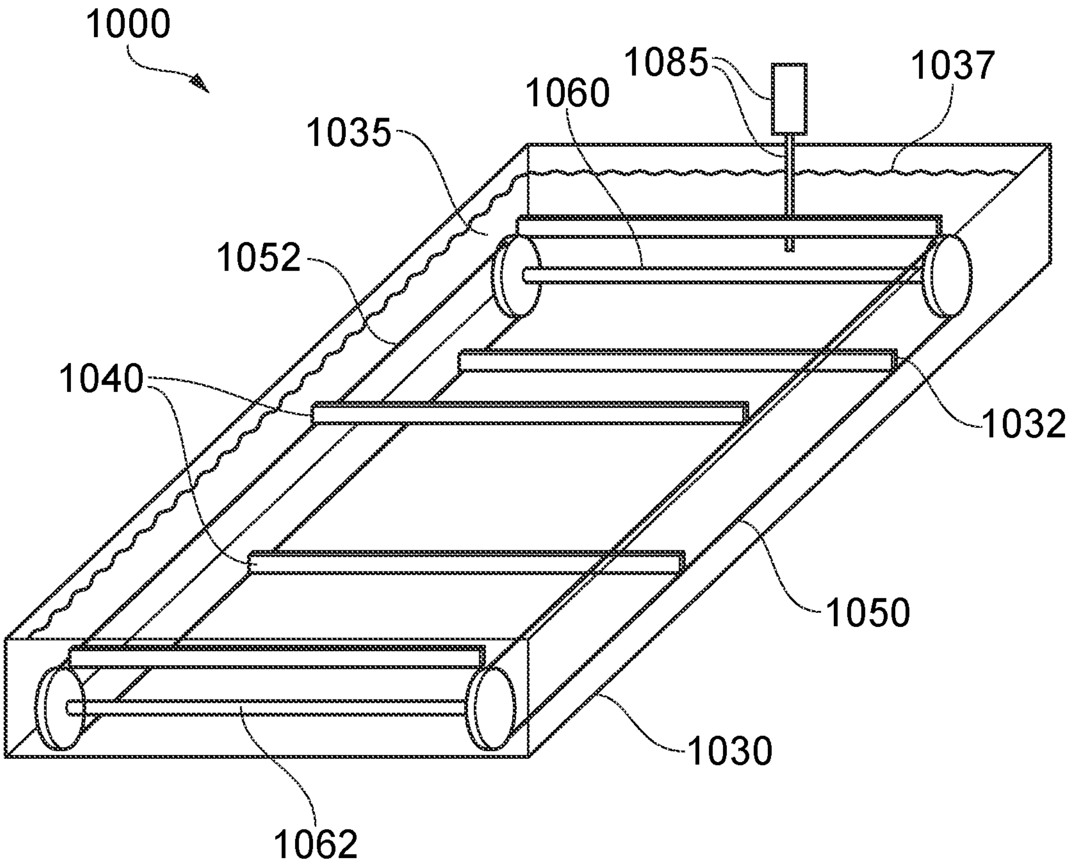
FIG. 10 illustrates a scraper system for moving liquid industrial waste within a de-watering bed, according to an example embodiment of the invention.

FIG. 10 illustrates a scraper system 1000 for moving liquid industrial waste in a de-watering bed. A de-watering bed 1030, and a scraper mechanism 1032 within the de-watering bed 1030, are shown. A scraper system 1000 may be located in each of multiple de-watering beds of a de-watering system.

Before the start of the de-watering process, liquid industrial waste 1035 fills the single illustrated de-watering bed 1030. Thus the liquid industrial waste 1035 fills de-watering bed 1032 approximately to the level visible as upper surface level 1037 in FIG. 10. The scraper mechanism 1032 comprises a series of blades 1040, with five blades 1040 illustrated in the example of FIG. 10. The blades 1040 are linked to each other by a first flexible band 1050 and a second flexible band 1052 of the scraper mechanism 1032, and spaced from each other. The first flexible band 1050 and the second flexible band run over a first axle 1060 and a second axle 1062 of the scraper mechanism 1032.

A motor, which is not shown, turns one of first axle 1060 and the second axle 1062, which causes first flexible band 1050 and the second flexible band to move over first axle 1060 and second axle 1062. Hence each blade 1040 mounted on the first flexible band 1050 and the second flexible band 1052 also moves. The movement of any one blade 1040 will be horizontally along the top of the scraper system 1000, which is towards the top of the de-watering bed 1030, then vertically down towards the base of the de-watering bed 1030 as the blade 1040 passes around one of the axles, and then horizontally in the opposite direction along the bottom of the de-watering bed 1030.

In operation, the blades 1040 will re-distribute the liquid industrial waste 1035. Particularly in the latter stages of de-watering, the blades 1040 may stir up the more viscous remnants of the liquid industrial waste 1035 from the bottom of de-watering bed 1030. This allows water to evaporate more easily from those viscous remnants. Movement of the blades 1040 at any point in the de-watering process also helps to ensure warming of a greater proportion of the liquid industrial waste 1035 by incident sunlight.

Thus scraper mechanism 1032 provides a series of movements of blades 1040 low in the de-watering bed 1030. Each moving blade 1040 acts to mix the liquid industrial waste 1035 in the bed effectively, at various different stages of the de-watering process, even when most of the initial water content has been lost by evaporation. At all stages of the de-watering process, scraper mechanism 1032 can enhance the evaporation of water from different portions of the liquid industrial waste 1032 at the open upper surface of de-watering bed 1030.

In an alternative arrangement not included in FIG. 10 for clarity, a pump may be located in the de-watering bed 1030. The pump is configured to circulate the liquid industrial waste 1035, as long as the liquid industrial waste 1035 remains sufficiently liquid to circulate by the action of a pump. The pump thus also serves to ensure that water can evaporate optimally from different portions of the liquid industrial waste 1035 at the open upper surface of the de-watering bed 1030. The pump has already been discussed above with the mention of other forms of agitator that can be used in the de-watering bed.

FIG. 11

Figure 11:
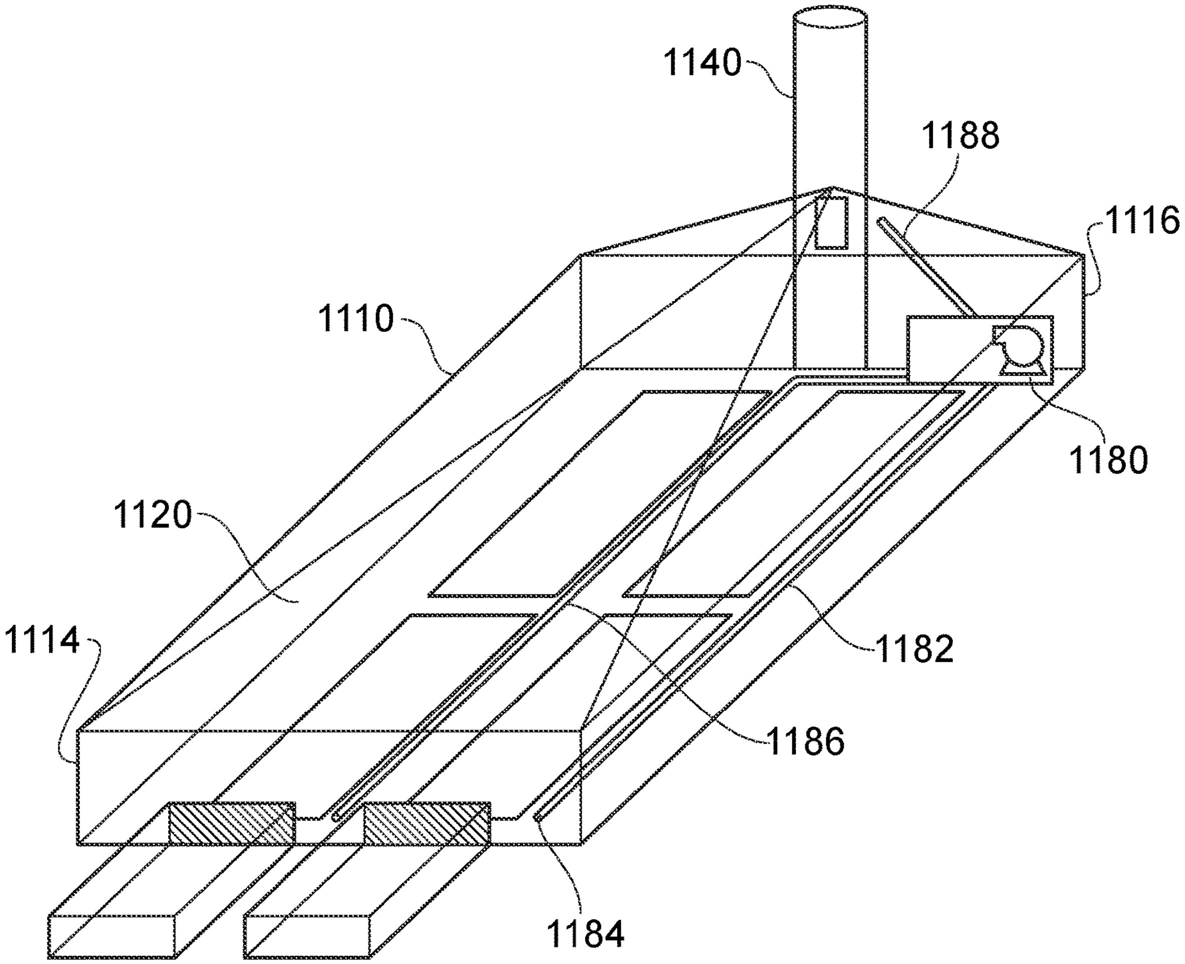
FIG. 11 illustrates an example embodiment of the invention.

FIG. 11 illustrates a first perspective view of an embodiment of the invention. Transparent structure 1110, first zone 1120 and air removal conduit 1140 are shown. Transparent structure 1110 has first end 1114 and second end 1116.

Air generation unit 1180 acts as 'hot box'. Air generation unit 1180 contains a fan and a generator of hot air. Hot air from air generation unit 1180 is supplied to first feeder tube 1182 and to second feeder tube 1186. First feeder tube 1182 and second feeder tube 1186 are configured to convey hot air to de-watering beds in the first zone 1120. As illustrated in FIG. 11, the hot air can be provided by first feeder tube 1182 and second feeder tube 1186 at one or more points that enhance the flow and temperature of other air that enters the first zone 1120. The output end 1184 of first feeder tube 1182 is shown towards the front of FIG. 11, i.e. close to the first end 1114 of transparent structure 1110. The hot air from first feeder tube 1182 and second feeder tube 1186 therefore contributes to evaporation of water from the de-watering beds, as hot air moves in the first direction through first zone 1120, from the first end 1114 towards the air removal conduit 1140 at second end 1116.

Air generation unit 1180 may use its fan to draw hot air through raised feeder tube 1188, down from a high point within first zone 1120. Thus the at least one feeder tube 1188 is configured to convey hot air to the de-watering beds from an upper portion to a lower point in the first zone 1120. However, there may be times when either the air in the first zone 1120 has not yet risen to a high enough temperature, or when air at the high point within first zone 1120 is too humid to be useful. During these times, the 'hot box' air generation unit 1180 may use its generator of hot air, which may be powered by electricity, to generate hot air for distribution via first feeder tube 1182 and second feeder tube 1186.

FIG. 4 provided an example of the invention with an energy capture system 446, which was located within the air removal conduit 440. In embodiments that are fitted with such an energy capture system 446, the electricity that is provided from the energy capture system 446 can contribute to powering the generator of hot air and the fan, within 'hot box' air generation unit 1180.

FIG. 12

Figure 12:
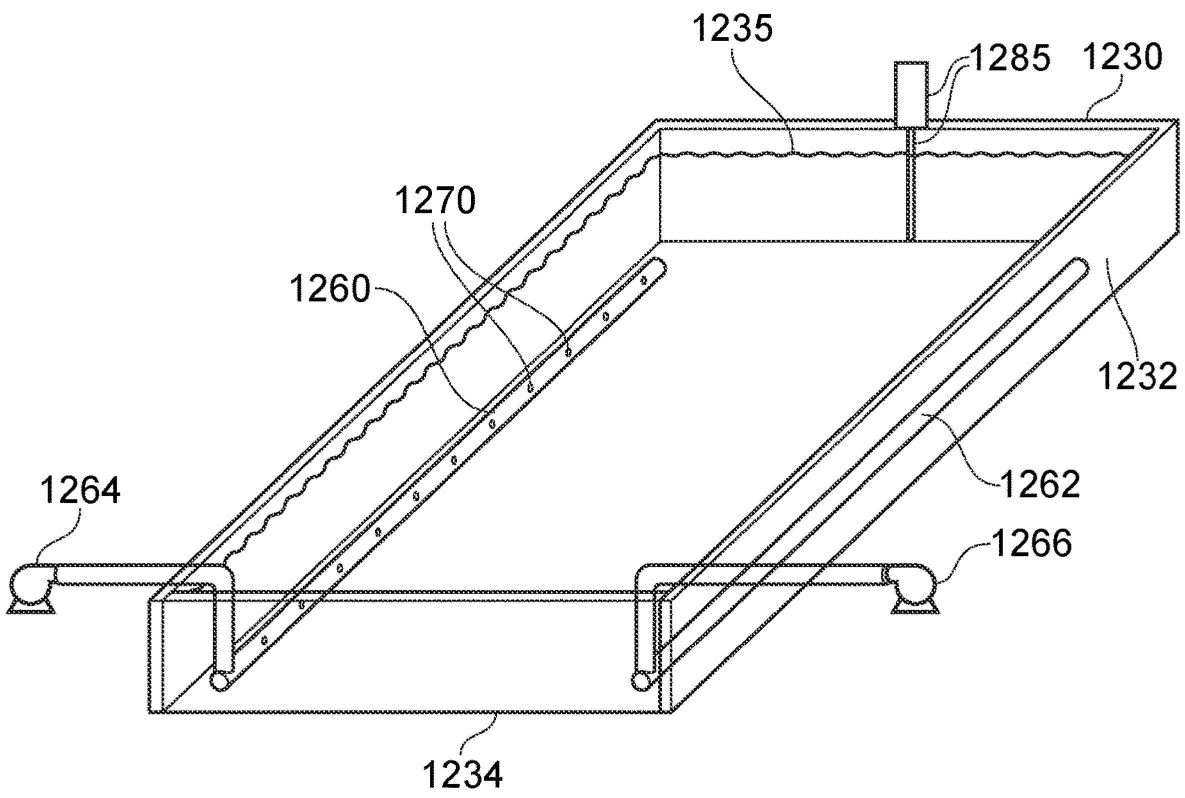
FIG. 12 illustrates an aerated de-watering bed, in according to an example embodiment of the invention.

FIG. 12 illustrates an individual de-watering bed 1230. FIG. 12 is specifically designed to show clearly the sides 1232 and the base 1234 of the de-watering bed 1230, which are concealed below the floor in the other Figs. A surface level of the liquid industrial waste 1235 is also shown. The depth of the de-watering bed may be in the range 0.5-2 metres, for example. A combined depth and temperature sensor 1285 for the liquid industrial waste 1235 is shown at the rear of de-watering bed 1230.

A first feeder tube 1260 and a second feeder tube 1262 are configured to convey hot air to the liquid industrial waste 1235. First hot air supply 1264 and second hot air supply 1266 provide the hot air. Aeration of the liquid industrial waste 1235 may be achieved by a variety of different approaches. One approach is to use the series of aeration holes 1270 that are shown on first feeder tube 1260. However, micro-aeration may be used, with significantly smaller holes. Alternatively, aeration discs may be placed along first feeder tube 1260 and second feeder tube 1262.

FIG. 13

Figure 13:
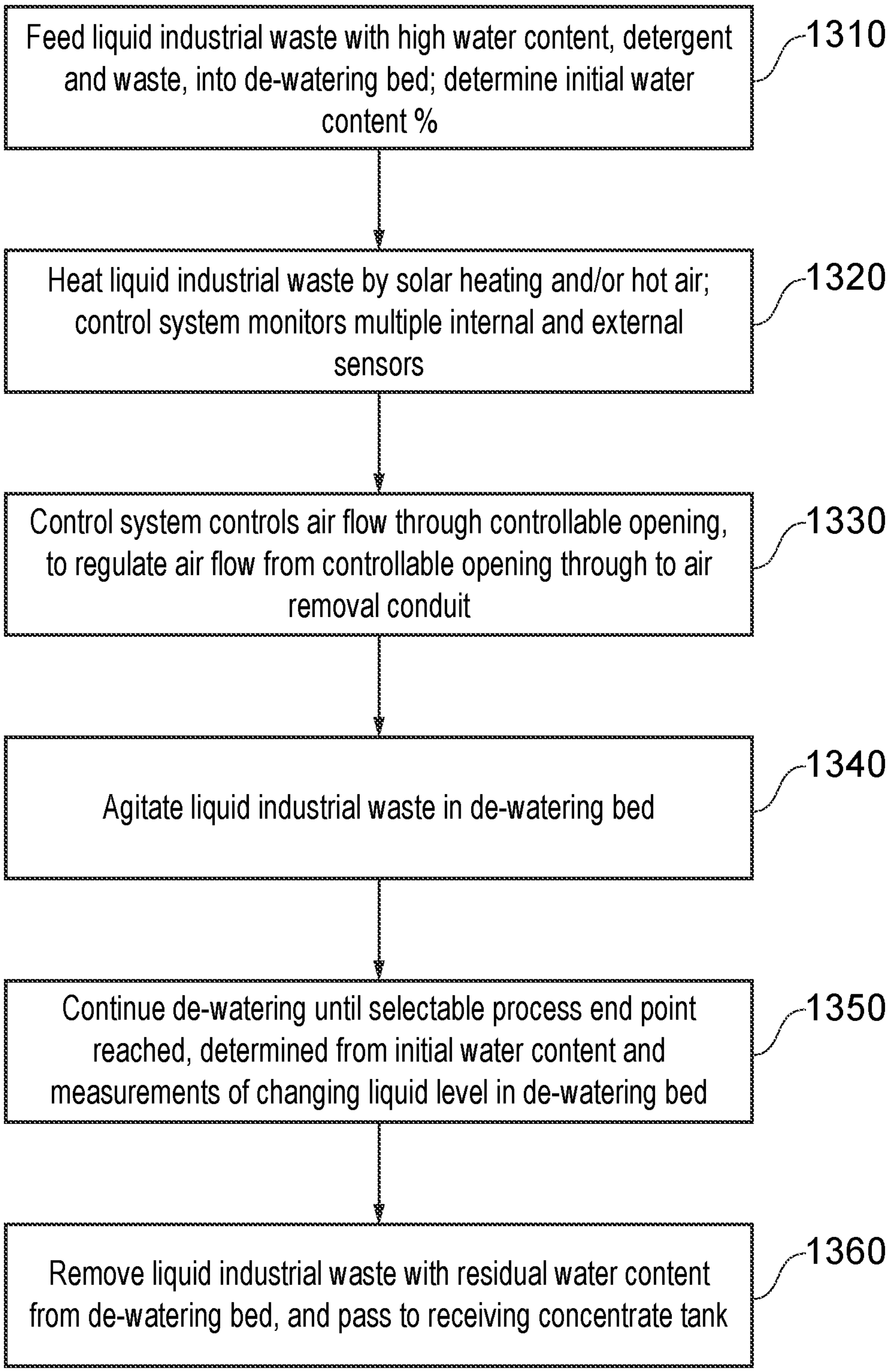
FIG. 13 Illustrates aspects of a method, according to example embodiments of the invention.

FIG. 13 illustrates aspects of a method in accordance with the invention.

A method of de-watering liquid industrial waste starts with determining an initial percentage of water content in the liquid industrial waste, and feeding the liquid industrial waste into a de-watering bed, see step 1310. In addition to water, the balance of the liquid industrial waste comprises at least detergents, and waste matter from the industrial cleaning process. The de-watering bed is located in a first zone enclosed by a transparent structure, and the liquid industrial waste and the air in the first zone are subject to solar heating during daytime, see step 1320. Additional hot air may be supplied, for example from a 'hot box' air generator, at specific times. A control system monitors multiple internal and external sensors, see also step 1320.

The method further comprises selectably controlling a first controllable opening at a first end of the transparent structure, to regulate a flow of air through the first zone. The control system dynamically regulates the air flow through the first controllable opening, to supply air to the first zone, see step 1330. The air passes as far as an air removal conduit at a second end of the transparent structure. The air removal conduit conveys the heated air from the first zone up the air removal conduit from a second opening at the second end of the transparent structure, and vents the heated air to the atmosphere. The effect of step 1330 is to evaporate water, from the liquid industrial waste in the de-watering bed, into the heated air in the first zone. The evaporated water then passes with the heated air through the first zone in a first direction, from the first end of the transparent structure to the second end of the transparent structure, and then in a second direction up the air removal conduit.

The liquid industrial waste may, optionally in some embodiments, be agitated in the de-watering bed, see step 1340.

The de-watering of the liquid industrial waste is continued until a selectable end point of the de-watering process has been reached, see step 1350. The selectable end point, as described in step 1350, may be determined from an initial water content of the liquid industrial waste, and measurements of changes in the liquid level in the de-watering bed, i.e. changes in the depth of the liquid industrial waste.

For clarity, FIG. 13 shows the final method step 1360. The liquid industrial waste with its residual water content is removed from the de-watering bed, and passed to the concentrate tank 876. The concentrate tank 876 is shown in FIG. 8.

The selectable end point of the de-watering process may be set in a variety of ways. In turn the control system of the invention may determine that the end point of the dewatering process has been reached, in a variety of ways. See again the discussion concerning FIG. 4 above, following Table 3, of various possible end points.

FIG. 14

Figure 14:
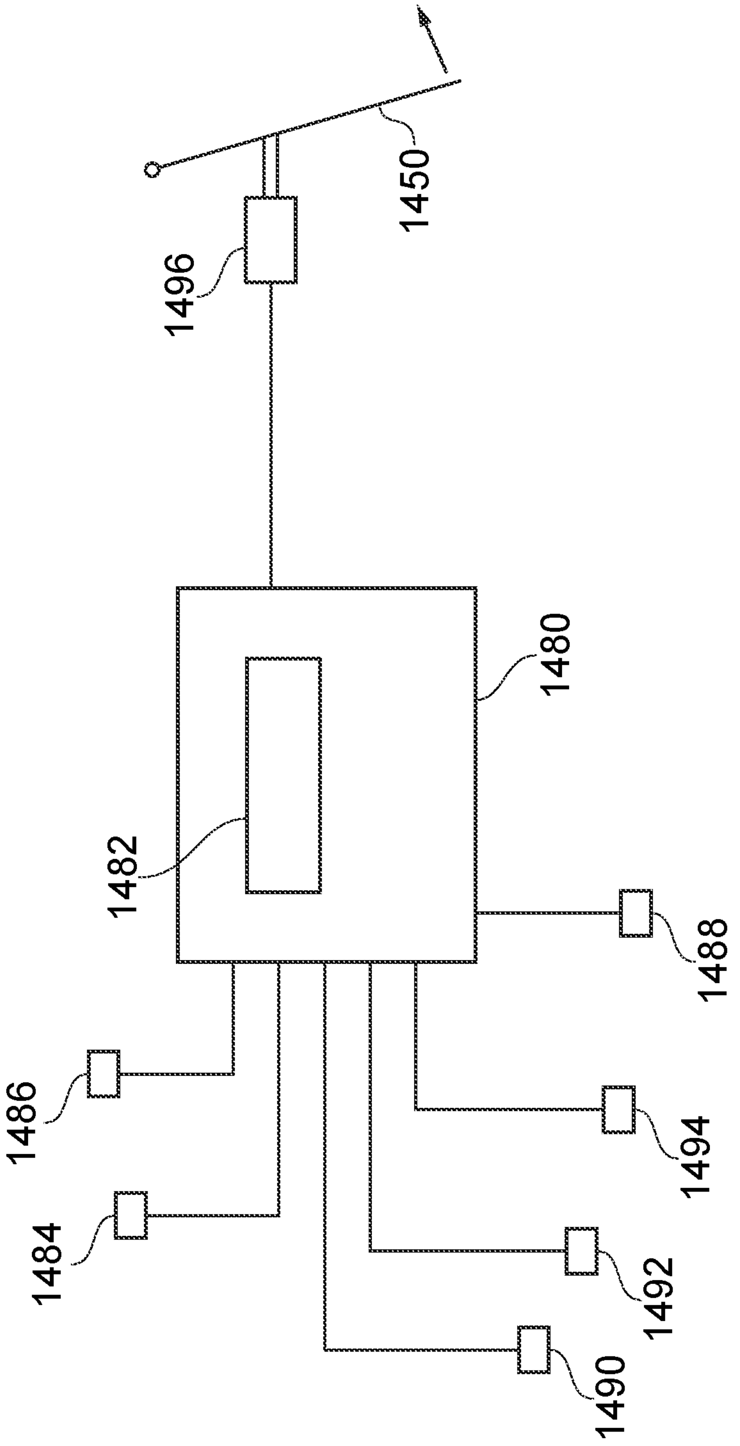
FIG. 14 illustrates a control system, sensors and an actuator according to example embodiments of the invention.

FIG. 14 illustrates a control system, sensors and an actuator in accordance with an embodiment of the invention. FIG. 14 illustrates a control system 1480, which corresponds to control system 380 at the lower left of FIG. 3A. Control system 1480 has a display 1482, which corresponds to display 382 in FIG. 3A.

FIG. 14 illustrates a group of internal sensors, which are sensors within the transparent structure 310 of FIG. 3A. The group of internal sensors in FIG. 3A comprises an air temperature sensor 1484 for air moving within the transparent structure 310; an absolute humidity sensor 1486; a liquid industrial waste temperature and level sensor 1488; a pressure sensor 1490; an air velocity sensor 1492, for air moving within the transparent structure 310; and a sensor of solar irradiance 1494. A second air temperature sensor may be provided, although not shown in FIG. 14, for air within the first pre-heating chamber 454 of FIG. 4 or the hot box 1180 of FIG. 11. In order to simplify FIG. 14, the further temperature sensors T1, T2 and T3 for the second feeder tube 562 and the air removal conduit 540 of FIG. 5A have not been shown. However, the control system 1480 may also receive measurements from the further temperature sensors T1, T2 and T3.

FIG. 14 illustrates an actuator 1496 and a controllable opening 1450. Controllable opening 1450 is configured to admit air into transparent structure 310. Control system 1480 determines a required rate of flow of air within transparent structure 310, on the basis of measurement values from at least air temperature sensor 1484 and absolute humidity sensor 1486. The determination may be made on the basis of further measurement values from one or more of the other sensors of the group of internal sensors.

Once control system 1480 has determined the required rate of flow of air within transparent structure 310, control system 1480 commands actuator 1496 to move the controllable opening 1450 to an appropriate opening value/setting. Thus control system 1480 and actuator 1496 together provide dynamic regulation and control of the rate of the flow of air in the first zone 320 of FIG. 3A. For example, the amount of solar insolation may increase, either towards the middle of the day, or if clouds clear. The air temperature in the first zone 320 would then increase. Air temperature sensor 1484 may then detect a rise in the temperature of the air in the first zone. In addition or instead, absolute humidity sensor 1486 may detect an increase in the humidity of the air in the first zone 320, if direct insolation to the liquid industrial waste increases the rate of evaporation of water. When air temperature sensor 1484 and/or absolute humidity sensor 1486 provide increased measurement values, then control system 1480 may command actuator 1496 to open controllable opening 1450 wider, to increase the rate of air flow in the first zone 320.

Thus the control system 1480 of FIG. 14 can be configured to receive measurement values from the various sensors of the group of internal sensors, and to regulate the rate of flow of air through the first zone in response to measurement values from air temperature sensor 1484 and absolute humidity sensor 1486. The control system 1480 can be further configured to regulate the rate of flow of air through the first zone in response to measurement values from at least one of the liquid industrial waste temperature sensor 1488, the pressure sensor 1490, the air velocity sensor 1492 and/or the sensor of solar irradiance 1494.

Controllable opening 1450 corresponds to first controllable opening 550 in FIG. 5A, or first controllable opening 450 in FIG. 4. First controllable opening 550 in FIG. 5A is arranged with a vertical hinge, allowing it to open as a door. First controllable opening 450 in FIG. 4 has a horizontal upper hinge, which corresponds to the opening action illustrated in FIG. 14 for controllable opening 1450. Controllable opening 1450 may also correspond to second controllable opening 452 in FIG. 4, or to any other openings that are designed to regulate a flow of air into the first zone 320. Other forms of controllable opening, such as a slidable panel that is flush with the transparent housing, or louvres, may also or alternatively be used.

In FIG. 14, the sensors are shown with wired connections to control system 1480. However, wireless connections may be used, in situations where the sensors can be provided with their own power, or can be interrogated remotely by technology that does not require them to have an active power source, for example by RFID technology.

The above description of control system 1480 and FIG. 14 have shown control system 1480 working with the set of internal sensors 1484-1494. In order to ensure conciseness, the applicant has not provided an identical schematic figure for a group of external sensors. External sensors are sensors located outside of the transparent structure 210. However, a group of external sensors may be provided in embodiments of the invention, to supply measurement values to control system 1480. When a set of external sensors is provided, the set of external sensors may comprise: a sensor of wind velocity outside the transparent structure; a sensor of solar irradiance onto the outside of the transparent structure; a sensor of pressure outside the transparent structure; a sensor of humidity of air outside the transparent structure; and a sensor of air temperature outside the transparent structure. When the set of external sensors is provided, the control system is further configured to receive measurement values from the group of external sensors, and to regulate the rate of flow of air through the first zone further in response to measurement values from at least one of the group of external sensors.

The control system of FIG. 14 may be configured to implement various methods of determining that the end point of the de-watering process has been achieved. See again step 1350 in FIG. 13. The two methods discussed below are examples of how the end point of the de-watering process can be ascertained, and these methods may be implemented in one or more de-watering beds.

Example 1

The method may start by determining and entering into the control system 1480 the initial volume of the liquid industrial waste, and the initial concentrations of non-water components of the liquid industrial waste. Subsequently, the method determines a volume of water that has evaporated from the liquid industrial waste. The selectable end point in the de-watering process is selected as a maximum value of residual concentration of non-water components in the liquid industrial waste, after de-watering. This is the target point of the process, which the method seeks to recognise, as de-watering progresses.

The control system 1480 determines that the selectable end point in the de-watering process has been reached, from: (i) the initial volume of the liquid industrial waste; (ii) the initial concentrations of non-water components of the liquid industrial waste; and (iii) the volume of water evaporated from the liquid industrial waste.

Example 2

The method may determine an initial volume, V1, of the liquid industrial waste in the de-watering bed, and a first initial concentration, C1, of non-water components of the liquid industrial waste in the de-watering bed. Values of the initial volume V1 and the first initial concentration are thus entered into the control system 1480. The method also determines a second initial concentration, C2, of non-water components, for liquid industrial waste in an acceptance tank 874 that holds liquid industrial waste for processing, and enters the second initial concentration into the control system 1480.

The method selects the selectable end point in the de-watering process as a maximum value, Cf, of residual concentration of non-water components in the liquid industrial waste in the dewatering bed, after de-watering. Then the method monitors the ongoing evaporation of water from the liquid industrial waste in the de-watering bed. After some evaporation, a second volume, V2, of liquid industrial waste is added from the acceptance tank 874 into the de-watering bed. The method enters the second volume V2 into the control system 1480, and continues the de-watering.

The method further comprises an ongoing determination of a current value for the volume, Vf, of liquid industrial waste remaining in the de-watering bed. The method then monitors/determines whether the selectable end point in the de-watering process has been reached, from: (i) the initial volume, V1, and the second volume V2; (ii) the initial concentration, C1, and the second initial concentration, C2; and (iii) the current volume, Vf.

The method may employ a formula, implemented by the control system 1480, to determine that the selectable end point in the de-watering process has been reached. The selectable end point is considered to have been reached when the current volume Vf is such that Cf is equal to: ((V1×C1)+(V2×C2))/Vf. The method may then terminate the de-watering process, and pass the liquid industrial waste remaining in the de-watering bed to the concentrate tank 876.

The method may also employ a formula in the general case of a total of n acceptance tanks 874, with the ith acceptance tank 874 having an initial concentration Ci of non-water components, and wherein a volume Vi of liquid industrial waste from the ith acceptance tank 874 is fed to the de-watering bed. In this case, the method implemented in the control system 1480 determines that the selectable end point in the de-watering process has been reached, when the current volume Vf is such that Cf is equal to: $((V_1 \times C_1)+(V_2 \times C_2)+ \ldots (Vi \times Ci) \ldots +(V_n \times C_n))/Vf$.

The method may then terminate the de-watering process, and pass the liquid industrial waste remaining in the de-watering bed to the concentrate tank 876.

FIG. 15

Figure 15:
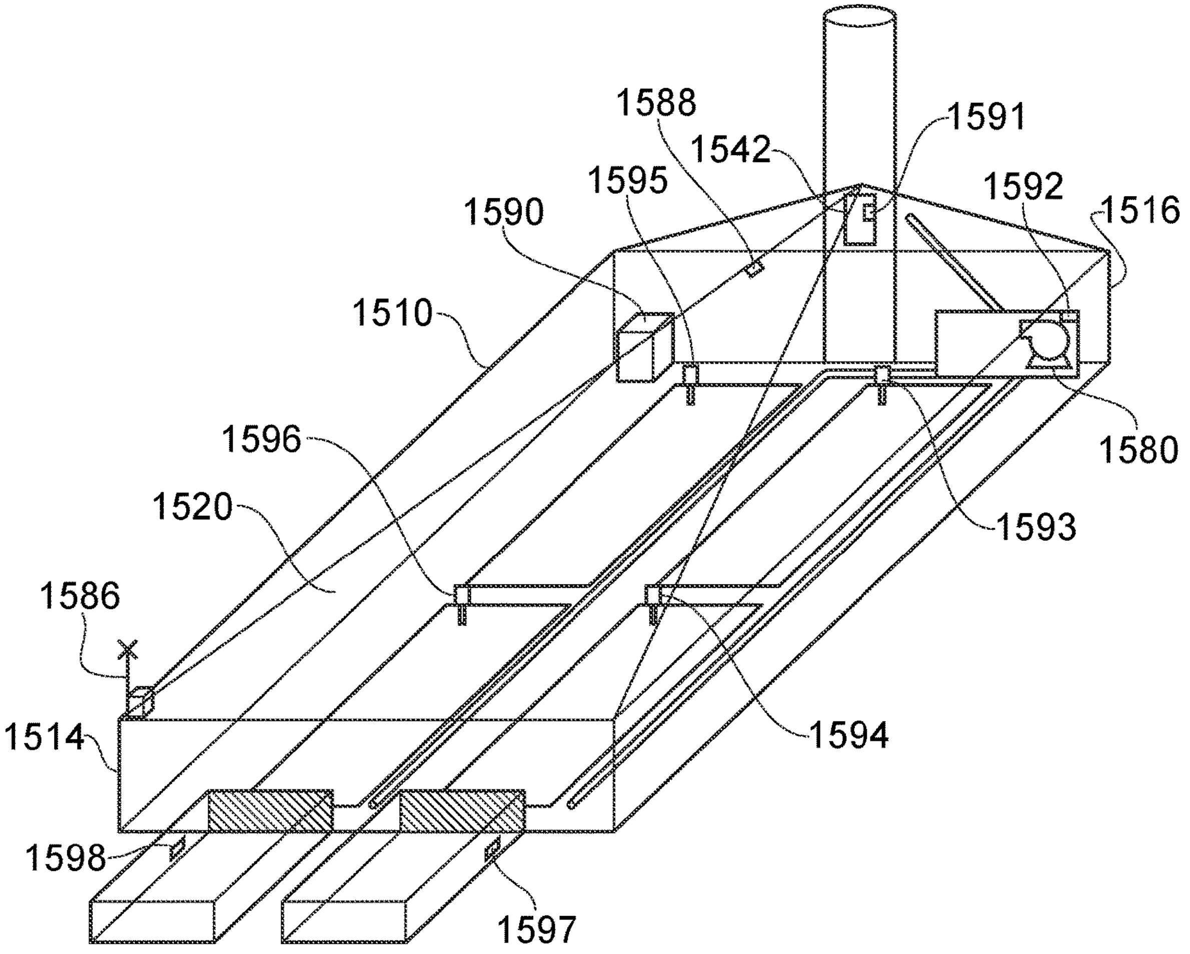
FIG. 15 illustrates a spatial distribution of sensors, according to example embodiments of the invention.

FIG. 15 illustrates an example of a spatial distribution of sensors in accordance with the invention. FIG. 15 illustrates transparent structure 1510, first zone 1520 and hot box 1580. Transparent structure 1510 has first end 1514 and second end 1516. Inlet 1542 corresponds to inlet 442 in FIG. 4. Control system 1590 is shown at the rear centre of FIG. 15, in this example located within the first zone 1520.

FIG. 15 illustrates a group of internal sensors. The sensors included in the exemplary embodiment of FIG. 15 are: a combined sensor 1588 of air temperature, air velocity and absolute humidity for air moving within the transparent structure 1510, the sensor also including a sensor of solar irradiance; a first combined liquid industrial waste level and temperature sensor 1593; a pressure sensor 1591; a second sensor 1592 of air temperature, for air within hot box 1580. Also shown are a third air temperature sensor 1597 and a fourth air temperature sensor 1598 for air within a pair of pre-heating air chambers.

Also shown is a set of external sensors 1586, which has been illustrated as a component and anemometer mounted at, and on top of, the first end 1514 of transparent structure 1510. The set of external sensors may comprise the set of external sensors discussed above with respect to FIG. 14. All of the sensors illustrated in FIG. 15 provide measurement values to the control system 1590 of FIG. 15. The sensors are shown without wireless connections to control system 1590, and instead use wireless connections.

FIG. 15 also shows a second combined liquid industrial waste level and temperature sensor 1594, a third combined liquid industrial waste level and temperature sensor 1595, and a fourth combined liquid industrial waste level and temperature sensor 1596. In general, each de-watering bed in the various embodiments of the invention described in the figures will be equipped with combined or separate sensors of the liquid industrial waste level and temperature.

In the de-watering system and method described above in FIGS. 2-15, various elements will contribute to the rate at which water evaporates from the liquid industrial waste in the de-watering bed(s). These elements will modify the two main parameters of evaporation, which are:

a) The difference between the actual humidity ratio of the air that is in contact with the surface of the liquid industrial waste, and the maximum humidity ratio of saturated air. That maximum humidity ratio is dependent on the variables of temperature and pressure.

b) The velocity of air across the surface of the liquid industrial waste.

FIG. 16

Figure 16:
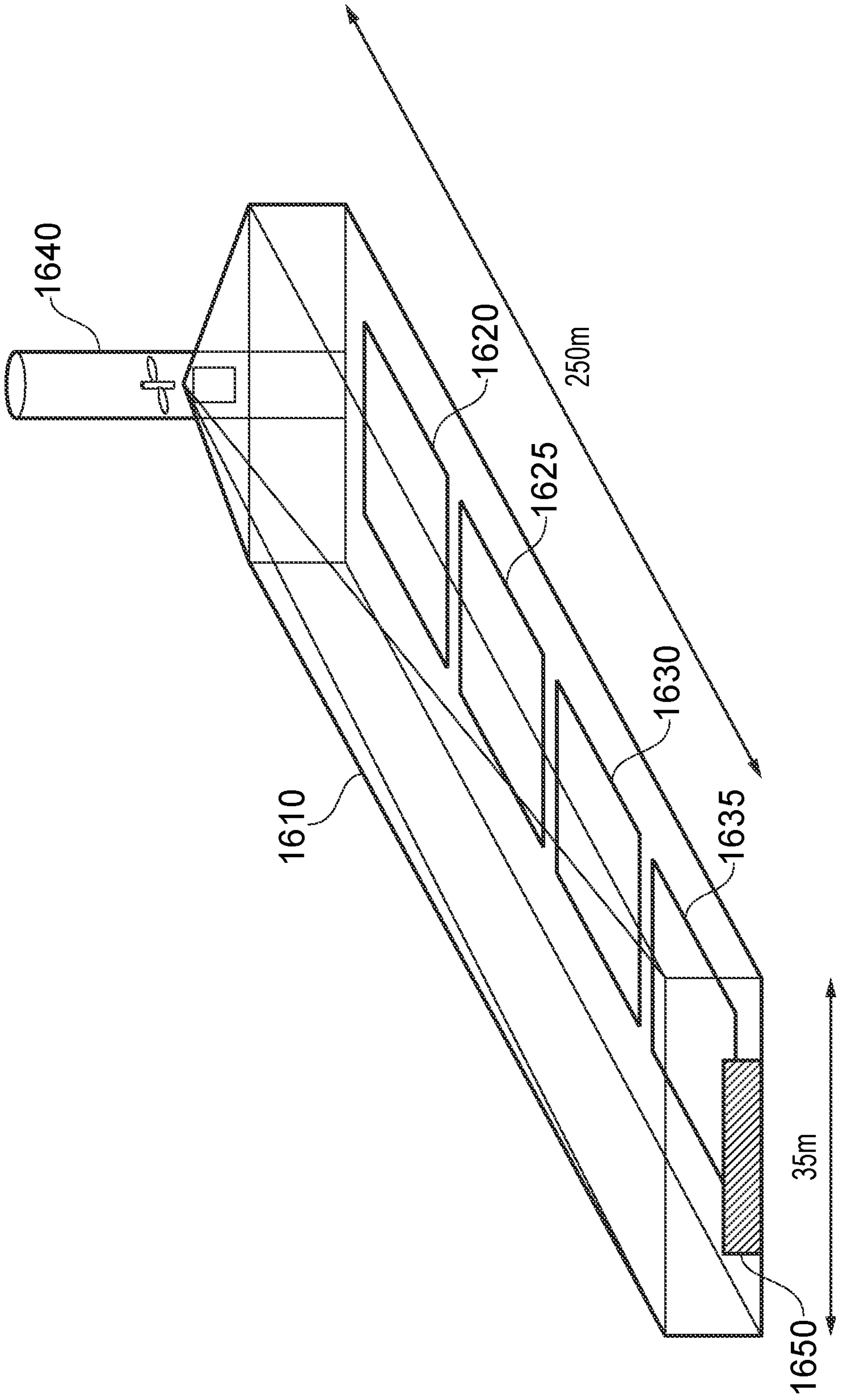
FIG. 16 is a perspective view of an example embodiment of the invention.

FIG. 16 is a perspective view of an example embodiment of the invention. FIG. 16 illustrates transparent structure 1610. First de-watering bed 1620, second de-watering bed 1625, third de-watering bed 1630 and fourth de-watering bed 1635 are arranged in a line. First de-watering bed 1620 is closest to air removal conduit 1640. Fourth de-watering bed 1635 is closest to first controllable opening 1650. In operation, a flow of air will move from first controllable opening 1650 to air removal conduit 1640.

Transparent structure 1610 is illustrated as being 250 metres in length, and 35 metres wide, in the non-limiting example of FIG. 16. Thus transparent structure 1610 generally is linear in shape, and effectively forms a tunnel. The dimensions in FIG. 16 are provided in order to aid visualisation of the structure. In general terms, transparent structure 1610 provides a first zone having a length in the first direction, i.e. the direction from first controllable opening 1650 to air removal conduit 1640, and a width transverse to the first direction, with the ratio of the length in the first direction and the width transverse to the first direction being at least 4:1.

FIG. 17

Figure 17:
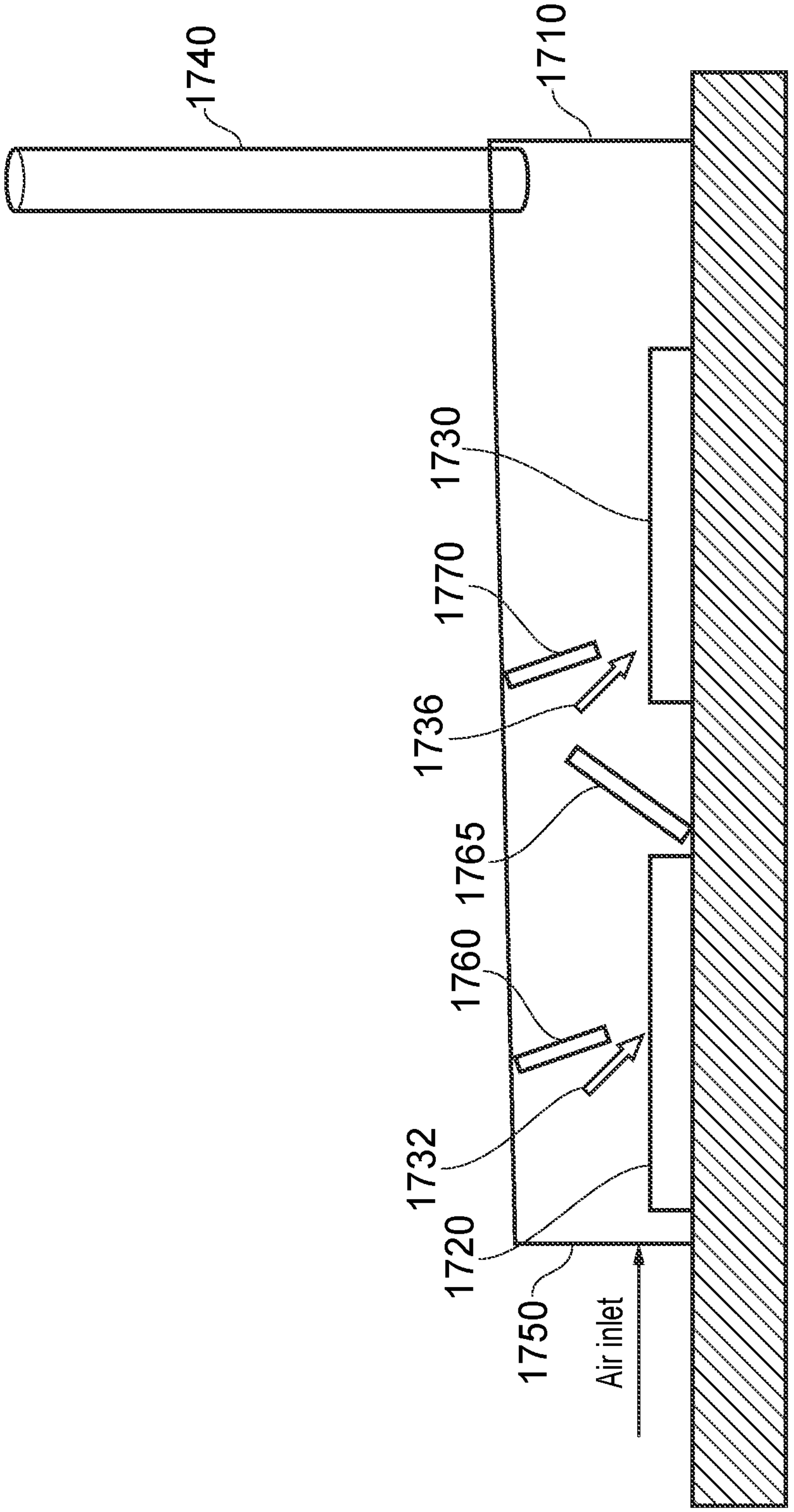
FIG. 17 is a side elevation cross-sectional view of an example embodiment of the invention.

FIG. 17 is a side elevation cross-sectional view of an example embodiment of the invention. FIG. 17 shows transparent structure 1710. First de-watering bed 1720 and second de-watering bed 1730 are illustrated, although more may be provided. First de-watering bed 1720 is closest to first controllable opening 1750. Second de-watering bed 1730 is closest to air removal conduit 1740.

A first baffle 1760 is located above first de-watering bed 1720. First baffle 1760 is shown deflecting flow of air 1732 downwards, towards first de-watering bed 1720. This enhances evaporation at the surface of the liquid industrial waste in first de-watering bed 1720.

A second baffle 1765 lies after first de-watering bed 1720 and before second de-watering bed 1730 in the first direction, in which air flows. Second baffle 1765 tends to direct the flow of air upwards, towards the roof of transparent structure 1710. Second baffle 1765 may also introduce turbulence, and may serve to more equally distribute the water content in the flow of air. A third baffle 1770 lies above second de-watering bed 1730. Third baffle 1770 is shown deflecting flow of air 1736 downwards, towards second de-watering bed 1730. This enhances evaporation at the surface of the liquid industrial waste in second de-watering bed 1730.

The number of baffles shown in FIG. 17 can be varied. The positions of the baffles within transparent structure 1710 and their orientation may also be varied.

FIG. 18

Figure 18:
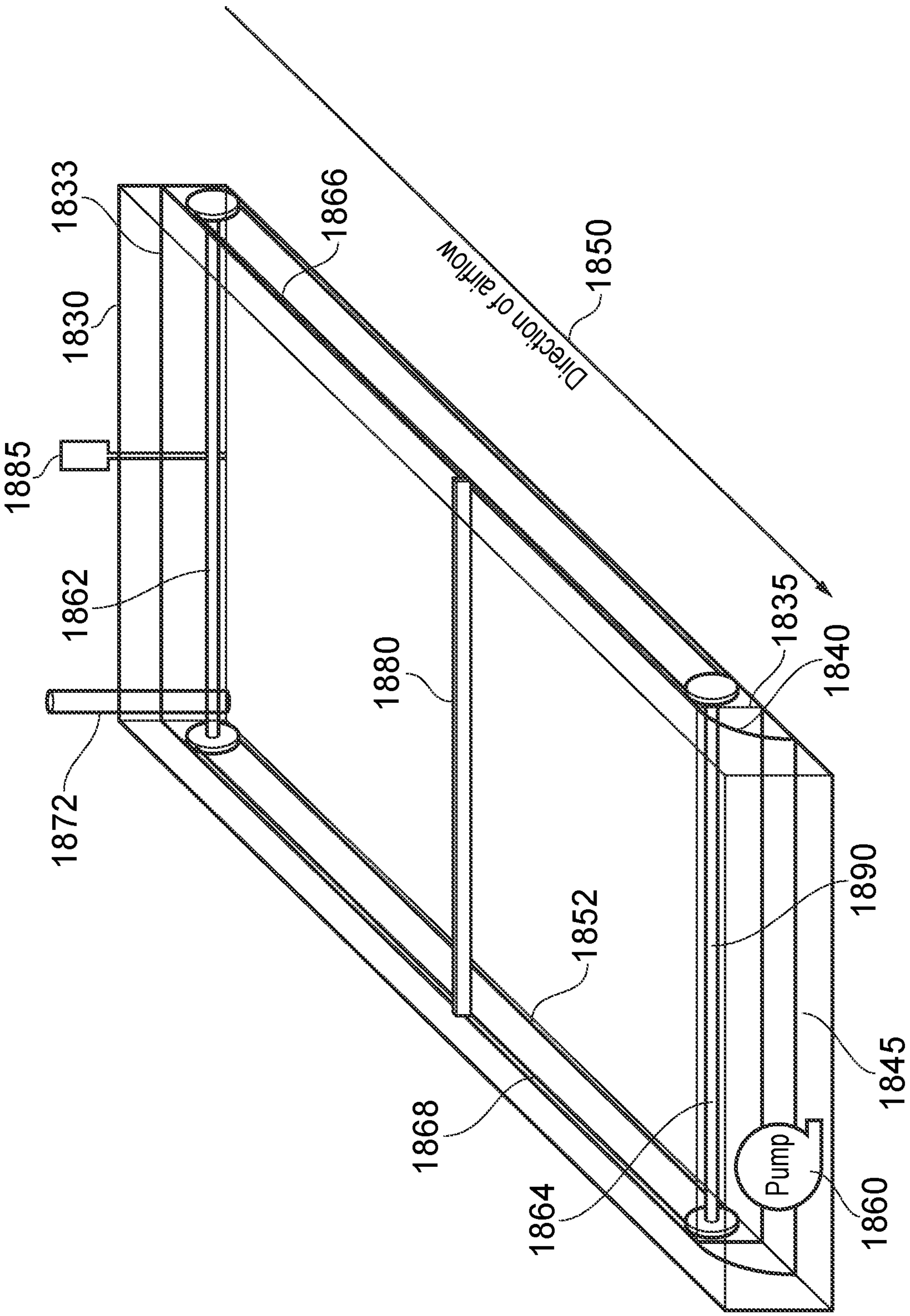
FIG. 18 is a perspective view of an example embodiment of the invention, with a surface scraper.

FIG. 18 is a perspective view of an example embodiment of the invention, with a surface scraper. De-watering bed 1830 contains liquid industrial waste 1833. Pipe 1872 allows the flow of liquid industrial waste 1833 into de-watering bed 1830.

A cascade wall 1835 is formed at the end of the de-watering bed at the front of the figure. A flow over the cascade wall 1835 is shown at 1840, the flow being a combination of liquid industrial waste and matter that was floating on liquid industrial waste 1833. However, the flow rate may be slower than that illustrated and may be only a trickle, or only solid matter/oil may pass over the cascade wall 1835.

A storage and separation zone 1845 is located at a side of the cascade wall 1835 outside the de-watering bed 1830. Storage and separation zone 1845 provides a containment zone, where matter that was floating on the surface of the liquid industrial waste 1833 can accumulate, after floating over the cascade wall 1835. Thus, in operation, oil and/or other floating waste can flow over the cascade wall 1835 into the storage and separation zone 1845. Pump 1860 is also provided. Pump 1860 selectably pumps liquid industrial waste out of the storage and separation zone 1845, if it has flowed over cascade wall 1835. Some liquid industrial waste will also flow over cascade wall 1835, and pump 1860 can then pump this liquid industrial waste back into the de-watering bed 1830, where it re-joins the remainder of the liquid industrial waste 1833.

A skimming device is configured to move across the upper surface of the liquid industrial waste 1833 and to remove oil and/or other floating waste from the upper surface of the liquid industrial waste 1833, thereby increasing a surface area of the liquid industrial waste that is exposed for evaporation. The skimming device comprises a blade 1880, although multiple blades may be provided. Blade 1880 is supported at either end on a first flexible band 1868 and a second flexible band 1866. The flexible bands 1868, 1866 run over first axle 1862 and second axle 1864, which are located at either end of the de-watering bed. The heights of first flexible band 1868 and second flexible band 1866 are such that blade 1880 is located at the surface of the liquid industrial waste 1833, in its highest position. In some embodiments, more axles than just first axle 1862 and second axle 1864 may be provided, in order to ensure that blade 1880 moves along at height that corresponds to the surface of the liquid industrial waste 1833.

A motor, which is not shown, turns one of the first axle 1862 and the second axle 1864. This rotation causes the flexible bands 1868, 1866 to move over the first axle 1862 and the second axle 1866, thereby pulling blade 1880 along the surface of the liquid industrial waste 1833. The movement of blade 1880 is towards the cascade wall 1835, when moving along the surface of the liquid industrial waste 1833. Thus blade 1880 performs a skimming action, and moves oil and other floating waste towards cascade wall 1835. Blade 1880, therefore, increases the rate at which oil and other floating waste will pass over cascade wall 1835 and into storage and separation zone 1835.

When blade 1880 passes around second axle 1864, it moves back towards first axle 1862 whilst submerged in the liquid industrial waste 1833. This may serve to mix the liquid industrial waste 1833.

Arrow 1850 shows a direction of air flow over the liquid industrial waste 1833. This direction of air flow 1850 is opposite to that in the preceding figures; de-watering bed 1830 has been illustrated with the cascade wall 1835 nearest to the point of view of the observer in FIG. 18, only in order to make the figure clearer. In an embodiment such as that of FIG. 2, or FIG. 16, the cascade wall 1835 is formed at an end of the de-watering bed closest to the second end 216 of the transparent structure 210. In such an embodiment, in operation, the flow of air in the first direction through the first zone 220 aids in transporting the oil and/or other floating waste to, and over, the cascade wall 1835.

Liquid level sensor 1885 provides an input to the control system of FIG. 14. Liquid level sensor 1885 and the control system of FIG. 14 co-operate to provide regulation of the operation of the de-watering bed 1830.

Liquid level sensor 1885 provides a measurement of a level of the liquid industrial waste 1833 in the de-watering bed. The control system is then configured to feed additional liquid industrial waste 1833 into the de-watering bed 1830 at a rate that maintains a level of the surface of the liquid industrial waste 1833. The level can be maintained to be high enough for oil and/or other floating waste to either (i) float over the cascade wall 1835; and/or (ii) be skimmed from the surface of the liquid industrial waste 1833. In order to maintain a desired level of the liquid industrial waste 1833, the control system is configured to source additional liquid industrial waste, for feeding into the de-watering bed 1830, from either: (i) an acceptance tank 874 that holds liquid industrial waste for processing; or (ii) the storage and separation zone 1845, using pump 1860. Acceptance tanks 874 are shown in FIG. 8.

FIG. 19

Figure 19:
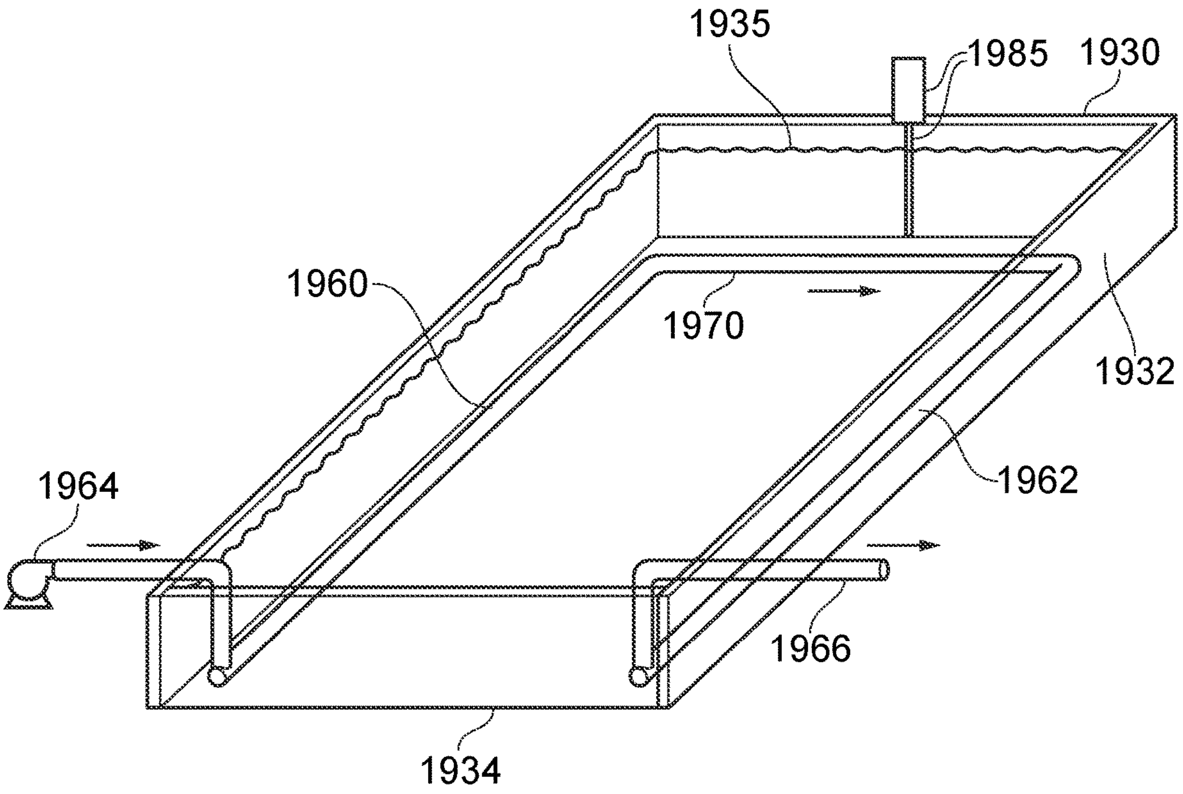
FIG. 19 is a perspective view an example embodiment of the invention, with a feeder tube within the de-watering bed.

FIG. 19 is a perspective view of an example embodiment of the invention, with a feeder tube within the de-watering bed that differs from the feeder tube design illustrated in FIG. 12. De-watering bed 1930 has sides 1932 and base 1934. A surface level 1935 of the liquid industrial waste is also shown. A combined depth and temperature sensor 1985 for the liquid industrial waste 1935 is shown at the rear of de-watering bed 1930.

A first portion of a feeder tube 1960 runs along the left edge of de-watering bed 1930, then a second portion of the feeder tube 1970 crosses the rear of the de-watering bed 1930, and joins a third portion of the feeder tube 1962 at the right edge of de-watering bed 1930. Feeder tubes 1960, 1970 and 1962 are configured to release heat through their walls, into the liquid industrial waste 1935. Feeder tubes 1960, 1970 and 1962 may contain either hot air, or a heated liquid. As an illustrative example, a hot air supply 1964 is shown at the input of feeder tube 1960.

When heated air is supplied to feeder tubes 1960, 1970 and 1962, the outlet end of the third feeder tube 1962 may vent up into the first zone, through a vent portion 1966. However, the outlet end of the vent portion 1966 may be arranged to vent outside the transparent housing. When heated liquid is supplied to feeder tubes 1960, 1970 and 1962, the outflow from second feeder tube 1962 is arranged to return the heated liquid outside the transparent housing for re-heating and re-use, or for disposal.

The portion of the feeder tube 1960 immediately adjacent to hot air supply 1964, and the vent portion 1966, both feed heat through their walls to the air in the first zone. The length of feeder tube portions that are above the liquid industrial waste, and in contact with the air in the first zone, may be made greater than that shown in FIG. 19. Such extra portions of feeder tube will increase the amount of heat provided through their walls to the air in the first zone.

In the foregoing specification, the invention has been described with reference to specific examples of embodiments of the invention. It will, however, be evident that various modifications and changes may be made therein without departing from the scope of the invention as set forth in the appended claims, and that the claims are not limited to the specific examples described above. Details have not been explained in any greater extent than that considered necessary, for the understanding and appreciation of the underlying concepts of the present invention and in order not to distract from the teachings of the present invention. The word 'comprising' does not exclude the presence of other elements or steps then those listed in a claim.

Furthermore, the terms 'a' or 'an,' as used herein, are defined as one or more than one. Also, the use of introductory phrases such as 'at least one' in the claims should not be construed to imply that the introduction of another claim element by the indefinite articles 'a' or 'an' limits any particular claim to embodiments of the invention containing only one such element. The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements.

I claim:

1. A de-watering system for a liquid industrial waste, the liquid industrial waste being a product of an industrial cleaning process, the liquid industrial waste comprising water, detergents, and waste matter from the industrial cleaning process, the system comprising:

a de-watering bed configured to hold the liquid industrial waste, the de-watering bed having closed sides, a base and an open upper surface, a first zone, the de-watering bed being located in the first zone, the first zone being enclosed by a transparent structure, the transparent structure:

(i) comprising a first end, a second end, and a roof, the first end and the second end being separated by two vertical sides of the transparent structure, with a first height of the first end being lower than a second height of the second end;

(ii) being located outdoors, whereby air in the first zone is subject to solar heating during daytime, (iii) having a first controllable opening at a first end of the transparent structure, the first controllable opening configured to admit air into the transparent structure; and (iv) having a second opening at a second end of the transparent structure, the second opening located higher than the first controllable opening at the first end, an air removal conduit at the second end of the transparent structure, the air removal conduit configured to allow heated air from the first zone to rise up the air removal conduit, from the second opening of the transparent structure, and to vent to the atmosphere, whereby the open upper surface of the de-watering bed is configured for water to evaporate from the liquid industrial waste into the heated air in the first zone, the water passing through the first zone in a first direction, from the first end of the transparent structure to the second end of the transparent structure, and passing in a second direction up the air removal conduit, an air temperature sensor and an absolute humidity sensor, in the transparent structure, connected to a control system, the control system configured to:

(i) receive measurement values from the air temperature sensor and the absolute humidity sensor;

(ii) regulate a rate of flow of air through the first zone in response to a value of air temperature from the air temperature sensor and/or a value of humidity from the absolute humidity sensor, by the control system commanding an actuator to move the first controllable opening, selectively opening the first controllable opening; and (iii) continue de-watering the liquid industrial waste until reaching a selectable end point in the de-watering process, the selectable end point being a maximum value of residual concentration of non-water components in the liquid industrial waste after de-watering.

2. The system of claim 1, further comprising:

a group of internal sensors located within the transparent structure and connected to the control system, the group of internal sensors comprising:

the air temperature sensor and the absolute humidity sensor;

and a plurality of:

a liquid industrial waste temperature sensor;

a pressure sensor;

an air velocity sensor; and a sensor of solar irradiance;

the control system being further configured to:

(i) receive measurement values from the group of internal sensors; and (ii) regulate the rate of flow of air through the first zone in response to measurement values from at least one of the liquid industrial waste temperature sensor, the pressure sensor, the air velocity sensor and/or the sensor of solar irradiance.

3. The system of claim 1, further comprising:

a group of external sensors, the group of external sensors connected to the control system and comprising a plurality of:

a sensor of wind velocity outside the transparent structure;

a sensor of solar irradiance onto the transparent structure;

a sensor of pressure outside the transparent structure;

a sensor of humidity outside the transparent structure; and a sensor of temperature outside the transparent structure;

the control system being further configured to:

(i) receive measurement values from the group of external sensors; and (ii) regulate the rate of flow of air through the first zone further in response to measurement values from the group of external sensors.

4. The system of claim 1, further comprising:

a) a liquid level sensor in the at least one de-watering bed, the liquid level sensor configured to measure a level of the liquid industrial waste in the at least one de-watering bed, the liquid level sensor connected to the control system;

b) the control system being configured to determine a change in the level of the liquid industrial waste, from a first measured initial value of the level of the liquid industrial waste, to a subsequent second measured value of the level of the liquid industrial waste after de-watering; and c) the selectable end point in the de-watering process is a selectable maximum value of residual water content in the liquid industrial waste after de-watering, the control system being configured to determine that the selectable end point in the de-watering process has been reached, on the basis of:

(i) an initial value of water content of the liquid industrial waste; and (ii) the change in the level of the liquid industrial waste.

5. The system of claim 1, wherein:

an initial value of water content of the liquid industrial waste is a water content of at least 90% by volume;

the control system is configured to continue de-watering the liquid industrial waste until reaching an end point with the liquid industrial waste having a residual water content of no more than 50% by volume, the remaining 50% comprising the detergents and the waste matter from the industrial cleaning process.

6. The system of claim 1, wherein:

an inlet to the air removal conduit is located at an upper portion of the second end of the transparent structure; and at least one venturi in the air removal conduit is positioned to decrease internal pressure in times of high winds outside the air removal conduit.

7. The system of claim 1, further comprising:

an energy capture system located in the air removal conduit, the energy capture system configured to convert kinetic energy of the heated air moving in the second direction in the air removal conduit into electrical energy.

8. The system of claim 1, further comprising:

at least one pre-heating chamber located at the first end of the transparent structure, outside the transparent structure, the at least one pre-heating chamber configured to pre-heat air and supply the pre-heated air to the first controllable opening at the first end of the transparent structure.

9. The system of claim 1, wherein:

multiple de-watering beds are located in the first zone, whereby the system is configured to operate with liquid industrial waste at different stages of de-watering in each de-watering bed.

10. The system of claim 1, further comprising:

an H-vertical axis wind blade with horizontal ventilator blades, mounted at the top of the air removal conduit.

11. The system of claim 1, further comprising:

a baffle within the first zone, the baffle positioned to redirect the flow of air towards the surface of the dewatering bed and/or create turbulence.

12. The system of claim 1, further comprising:

the control system being configured to regulate the rate of flow of air through the first zone at least partly on the basis of an estimate of the rate of evaporation of water from the open upper surface of the de-watering bed, the estimate being made according to the formula:

$$g = \Theta \times A \times X$$

wherein:

g is the amount of evaporated water;

$\ominus$ is an evaporation coefficient comprising a variable v, the velocity of air above the water surface;

A is water surface area;

X is difference between the maximum and actual humidity ratio of the air.

13. The system of claim 1, further comprising:

the first zone having a length in the first direction and a width transverse to the first direction, the ratio of the length in the first direction and the width transverse to the first direction being at least 4:1, thereby forming a tunnel.

14. The system of claim 1, wherein the first zone has:

a length in the first direction of 250 metres; and a width transverse to the first direction of 35 metres.

15. The system of claim 1, further comprising:

a skimming device configured to move across the upper surface of the liquid industrial waste and to remove oil and/or other floating waste from the upper surface of the liquid industrial waste, thereby increasing a surface area of the liquid industrial waste that is exposed for evaporation.

16. The system of claim 1, further comprising:

a cascade wall formed at an end of the at least one de-watering bed; and a storage and separation zone located at a side of the cascade wall outside the de-watering bed, whereby, in operation, oil and/or other floating waste can flow over the cascade wall into the storage and separation zone.

17. The system of claim 16, further comprising:

the cascade wall formed at an end of the de-watering bed closest to the second end of the transparent structure, whereby, in operation, the flow of air in the first direction aids in transporting the oil and/or other floating waste to and over the cascade wall.

18. The system of claim 16, further comprising:

a) a liquid level sensor in the at least one de-watering bed, the liquid level sensor configured to provide a measurement of a level of the liquid industrial waste in the at least one de-watering bed; and b) the control system being configured to feed liquid industrial waste into the de-watering bed at a rate that maintains a level of a surface of the liquid industrial waste in the de-watering bed high enough for oil and/or other floating waste to:

(i) flow over the cascade wall; and/or (ii) be skimmed from the surface;

c) the control system being configured to source liquid industrial waste, for feeding into the de-watering bed, from either:

(i) an acceptance tank that holds liquid industrial waste for processing; or (ii) the storage and separation zone.

19. The system of claim 1, wherein the first zone has:

a length of at least 100 metres;

a width of at least 40 metres;

the height of the first end being in the range of 2-3 metres;

a height of the second end being in the range of 3-4 metres.

* * * * *